(12) United States Patent
Nagasaka et al.

(10) Patent No.: US 8,249,427 B2
(45) Date of Patent: Aug. 21, 2012

(54) CONTENT PLAYING DEVICE, CONTENT PLAYING METHOD, PROGRAM, AND CONTENT PLAYING SYSTEM

(75) Inventors: Hideo Nagasaka, Kanagawa (JP); Sho Murakoshi, Tokyo (JP); Toshimasa Miyoshi, Kanagawa (JP); Tadaaki Kimijima, Tokyo (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 12/476,325

(22) Filed: Jun. 2, 2009

(65) Prior Publication Data

US 2009/0297128 A1 Dec. 3, 2009

(30) Foreign Application Priority Data

Jun. 3, 2008 (JP) .................................. 2008-146011

(51) Int. Cl.
*H04N 5/93* (2006.01)
(52) U.S. Cl. ..... 386/278; 386/283; 386/353; 369/30.05; 369/47.13; 369/83; 715/723
(58) Field of Classification Search .................. 386/278, 386/283, 353; 715/723; 369/30.05, 47.13, 369/83
See application file for complete search history.

(56) References Cited

U.S. PATENT DOCUMENTS

| 7,624,189 | B2 * | 11/2009 | Bucher | 709/229 |
|---|---|---|---|---|
| 7,716,572 | B2 | 5/2010 | Beauregard et al. | |
| 7,716,660 | B2 * | 5/2010 | Mackay | 717/173 |
| 8,078,729 | B2 * | 12/2011 | Kozat et al. | 709/226 |
| 2003/0204602 | A1 | 10/2003 | Hudson et al. | |
| 2006/0190615 | A1 * | 8/2006 | Panwar et al. | 709/231 |
| 2006/0288424 | A1 * | 12/2006 | Saito | 726/26 |
| 2007/0221045 | A1 | 9/2007 | Terauchi et al. | |
| 2007/0297755 | A1 | 12/2007 | Holt et al. | |
| 2008/0133767 | A1 * | 6/2008 | Birrer et al. | 709/231 |

(Continued)

FOREIGN PATENT DOCUMENTS

EP 1 775 726 A1 4/2007

(Continued)

OTHER PUBLICATIONS

[No Author Listed] Blu-ray Disc. White Paper Blu-ray Disc Format. 2.A logical and audio visual application format specifications for BD-RE. Blu-Ray Disc Founders. Aug. 2004. 26 pages.

*Primary Examiner* — Helen Shibru
(74) *Attorney, Agent, or Firm* — Wolf, Greenfield & Sacks, P.C.

(57) ABSTRACT

A content playing device includes: an identifying unit to identify, with regard to subsidiary contents created by secondarily using contents as editing material and having playback control information instructing playback of actual content data of source editing material contents which are primary contents serving as source editing material, lacking primary contents which are the source editing material contents that are not included in held primary contents deemed to be held by a user; a sample content obtaining unit to externally obtain sample contents corresponding to the lacking primary contents; and a playback processing unit to execute, at the time of playing subsidiary contents following playback control information, playback signal processing for actual content data of held source editing material contents currently existing as the held primary contents regarding held source editing material contents, and playback signal processing for actual content data of corresponding sample contents regarding the lacking primary contents.

6 Claims, 20 Drawing Sheets

U.S. PATENT DOCUMENTS

| | | |
|---|---|---|
| 2008/0235268 A1* | 9/2008 | Miyoshi et al. ............... 707/102 |
| 2008/0235356 A1* | 9/2008 | Miyoshi et al. ............... 709/219 |
| 2008/0259745 A1 | 10/2008 | Sako et al. |
| 2008/0310267 A1 | 12/2008 | Hattori et al. |
| 2009/0106261 A1 | 4/2009 | Nagasaka et al. |
| 2009/0119273 A1* | 5/2009 | Nagasaka et al. ................ 707/4 |
| 2009/0299823 A1* | 12/2009 | Nagasaka et al. ............... 705/10 |
| 2009/0299981 A1 | 12/2009 | Nagasaka et al. |
| 2009/0300036 A1 | 12/2009 | Nagasaki |

FOREIGN PATENT DOCUMENTS

| | | |
|---|---|---|
| JP | 11-250145 A | 9/1999 |
| JP | 2000-113066 | 4/2000 |
| JP | 2001-292115 A | 10/2001 |
| JP | 2001-338159 A | 12/2001 |
| JP | 2003-085950 | 3/2003 |
| JP | 2003-109361 A | 4/2003 |
| JP | 2005-102128 A | 4/2005 |
| JP | 2005-318099 A | 11/2005 |
| JP | 2006-107693 | 4/2006 |
| JP | 2007-226855 | 9/2007 |
| WO | WO 03/088673 A1 | 10/2003 |

* cited by examiner

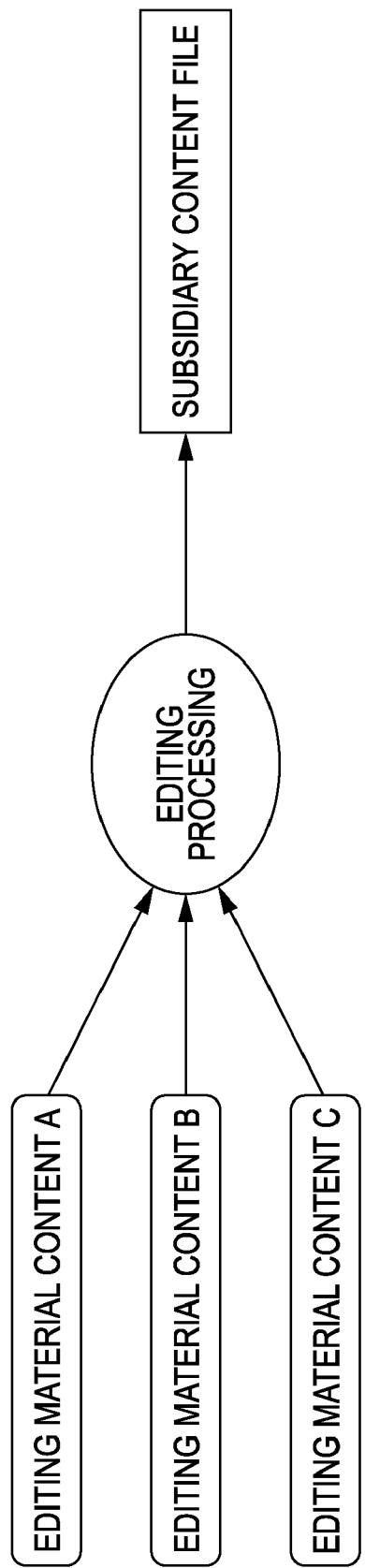

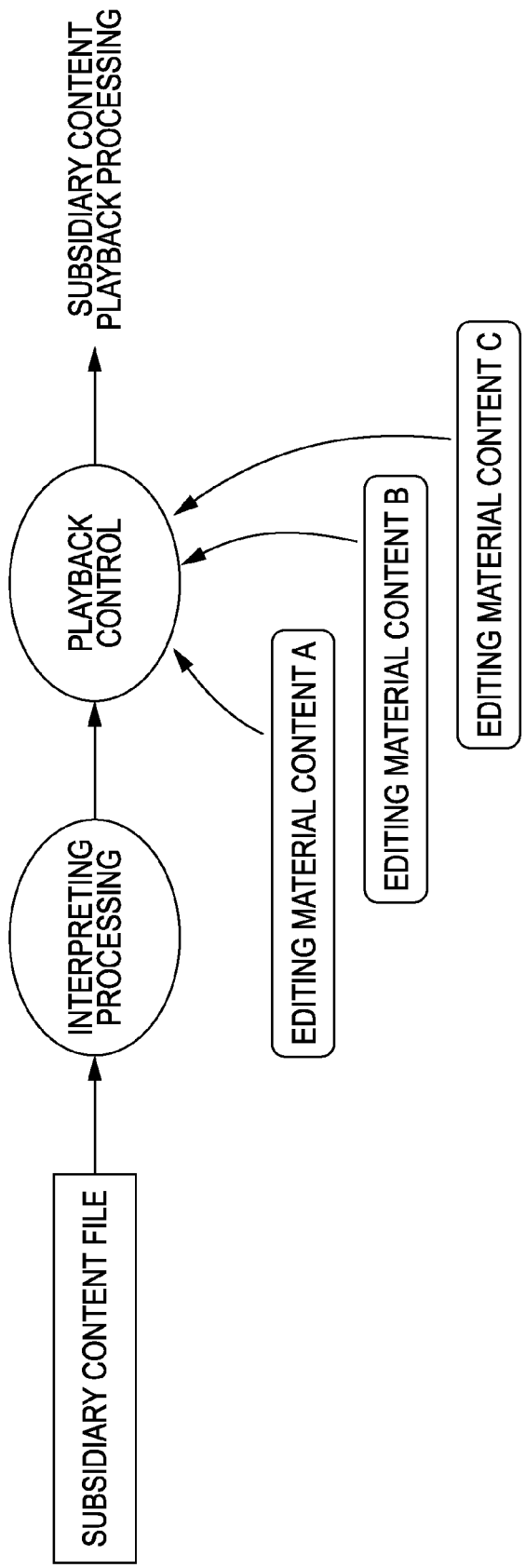

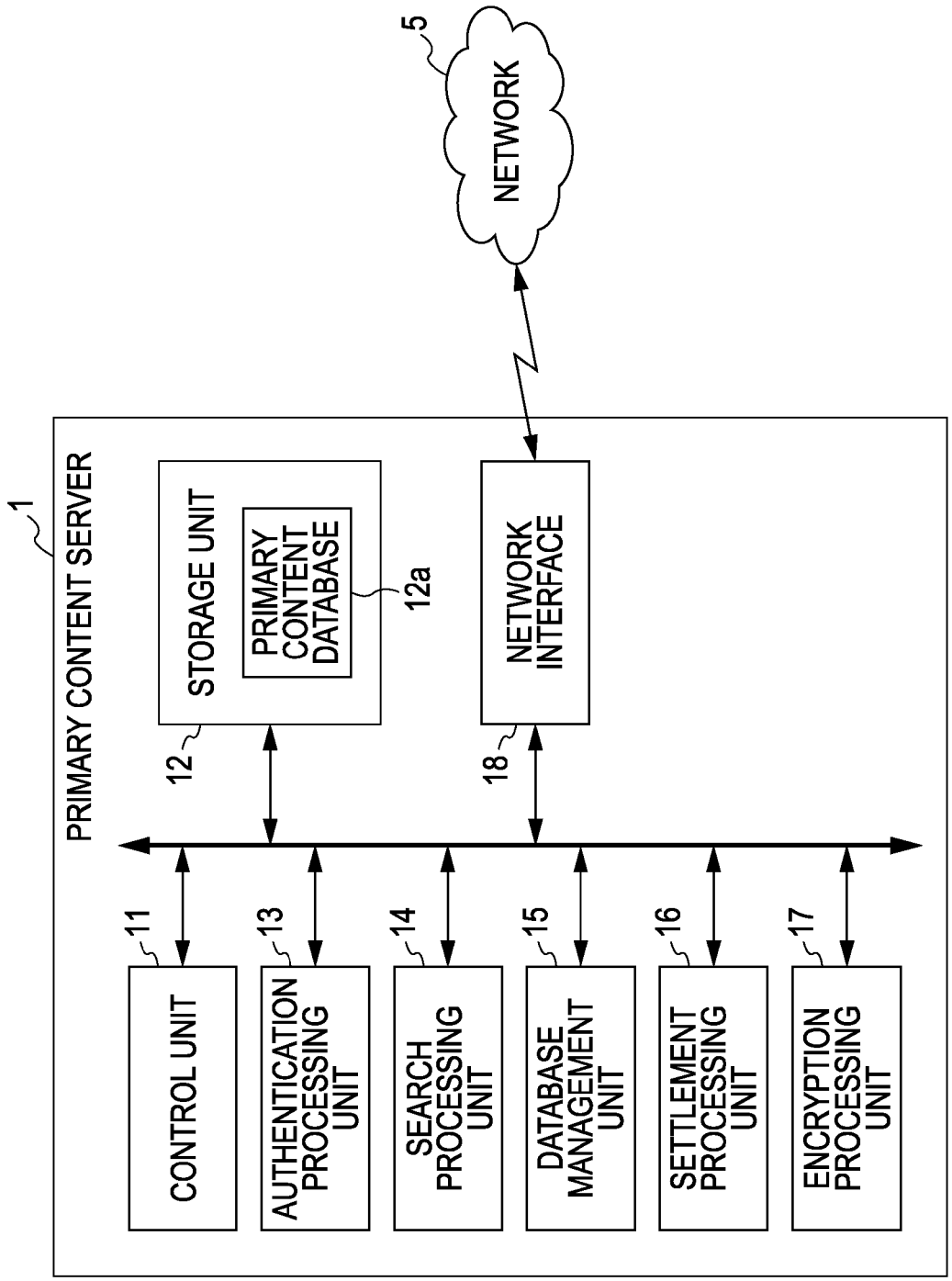

FIG. 16

| | | CONTENT ID | AAAAAA |
|---|---|---|---|
| UNIT FILE INFORMATION | | CREATOR | - - - - |
| | | TITLE | - - - - |
| | | GENERATION | (1 TO N) |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM n | PERMITTED |
| UNIT FILE INFORMATION | | CONTENT ID | BBBBBB |
| | | CREATOR | - - - - |
| | | TITLE | - - - - |
| | | GENERATION | (1 TO N) |
| | USAGE AGREEMENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM n | NOT PERMITTED |
| UNIT FILE INFORMATION | | CONTENT ID | CCCCCC |
| | | CREATOR | - - - - |
| | | TITLE | - - - - |
| | | GENERATION | (1 TO N) |
| | USAGE AGREEMENT RANGE INFORMATION | USAGE ITEM 1 | NOT PERMITTED |
| | | USAGE ITEM 2 | PERMITTED |
| | | ⋮ | ⋮ |
| | | USAGE ITEM n | PERMITTED |

FIG. 17

[
file_id = AAAAAA
time = 00:00 − 00:10
position = vv − zz
]
[
file_id = AAAAAA
time = 00:10 − 00:15
position = ss − tt
]
[
file_id = BBBBBB
time = 00:15 − 00:20
position = pp − uu
]
.
.
.
.

CONTENT PLAYING DEVICE, CONTENT PLAYING METHOD, PROGRAM, AND CONTENT PLAYING SYSTEM

CROSS REFERENCE TO RELATED APPLICATIONS

The present application claims priority under 35 U.S.C. § 119 to Japanese Priority Patent Application JP 2008-146011, filed in the Japan Patent Office on Jun. 3, 2008, the entire contents of which are hereby incorporated by reference.

BACKGROUND OF THE INVENTION

1. Field of the Invention

The present invention relates to a content playing device and a method thereof for playing subsidiary contents created by editing wherein contents are secondarily used for example, a program which the content playing device executes, and a content playing system configured of the content playing device and a server device.

2. Description of the Related Art

As for one form of network usage, so-called content distribution and sharing of audio, video, and so forth, has widely come to be performed. For example, with a content distribution system, a great number of data files serving as contents to be distributed are saved and managed at a server. A user having an information processing terminal device such as a personal computer operates application software (client software) having a client function corresponding to content distribution, so as to download the desired content from the server. The data file serving as content that has been downloaded in this way is normally managed by being stored and saved in a storage device within the information processing terminal device by the client software. Subsequently, the user can listen to/view and enjoy this as sound and/or video, by performing an operation at the client software for playing the data file serving as the content stored in the information processing terminal device.

Also, with a content sharing system, a user of an information processing terminal, for example, uploads to a server data files serving as contents such as audio, video, and so forth. A server of such a sharing system has a site (Web page) for posting uploaded contents. A user of a general information processing terminal device can access this site and search for contents he/she is interested in, for example. Contents found by this searching are accessed or downloaded and played, so as to be viewed/listened to, and thus are shared.

On the other hand, there is application software (editing software) capable of taking in audio data and video data and the like as material, so as to be modified, edited, and a new tune can be created, and in recent years in particular, there is widespread use thereof, from that which is easy to operate to complicated, by also common users as well.

As described above, such editing software can execute processing for changing actual data (audio/video data and so forth) serving as contents, for editing thereof. Accordingly, in the case of audio contents for example, modifying and editing or the like by taking in a part of original tune data as material, such with as so-called sampling, mash-ups, and so forth, can be easily performed. In fact, many tunes created by such techniques have been released by professional musicians or the like, for example. Description of such related art can be found in Japanese Unexamined Patent Application Publication No. 2000-113066 and Japanese Unexamined Patent Application Publication No. 2003-85950.

SUMMARY OF THE INVENTION

With a background such as described above, it can be thought that there would be a considerable number of common users who desire not only to simply play and enjoy the data of contents which can be obtained by content distribution and content sharing and so forth, but also creating new works by performing secondary editing using editing software, and publicly presenting (posting) the work for other users to view/listen to.

Accordingly, the present invention proposes configuring a content sharing system on a network whereby general users for example can perform secondary use of contents held at the user terminal side and perform editing to create subsidiary contents, and can publicly present contents created in this way, by way of a server or the like. Thus, with this content sharing system, subsidiary contents existing on the network will be managed for content sharing. Enabling setting of the importance of each subsidiary content as one way of such managing would enable better service of the content sharing system, which would be advantageous.

With this in mind, in a case of configuring such a content sharing system, we can assume a case wherein, at the time of playing a subsidiary content, the content data serving as the original content data of the subsidiary content has to be available, depending on the nature of the subsidiary content. In this case, a user who wants to view/listen to the subsidiary content has to locally have the original content data for playing the subsidiary content, at his/her own terminal (application software compatible with the content sharing system), for example. In other words, even if a user wants to play a certain subsidiary content, the data of all of the content for playing the subsidiary content has to be present to play in a complete form. However, having the user to obtain and save all content data for playing and viewing/listening to subsidiary content beforehand places a considerably great burden on the user, which is undesirable.

A content playing device according to an embodiment of the present invention includes: an identifying unit configured to identify, with regard to subsidiary contents created by editing processing secondarily using at least one of contents as editing material and having, as information for reproducing the content of contents, playback control information formed of content instructing playback of actual content data of source editing material contents which are primary contents serving as source editing material, lacking primary contents, which are the source editing material contents that are not included in held primary contents deemed to be held by a user; a sample content obtaining unit configured to externally obtain sample contents corresponding to the lacking primary contents; and a playback processing unit configured to execute, at the time of playing the subsidiary contents following the playback control information, playback signal processing for actual content data of held source editing material contents currently existing as the held primary contents, for held source editing material contents which are the source editing material contents included in the held primary contents, and playback signal processing for actual content data of corresponding sample contents regarding the lacking primary contents.

A content playing system according to an embodiment of the present invention includes a content playing device and a server device. The content playing device further includes an identifying unit configured to identify, with regard to subsidiary contents created by editing processing secondarily using at least one of contents as editing material and having, as information for reproducing the content of contents, playback control information formed of content instructing playback of actual content data of source editing material contents which are primary contents serving as source editing material, lacking primary contents, which are the source editing material contents that are not included in held primary contents deemed to be held by a user; a sample content obtaining unit configured to externally obtain, from the server device, contents corresponding to the lacking primary contents by communication via a communication network, and a playback processing unit configured to execute, at the time of playing the subsidiary contents following the playback control information, playback signal processing for actual content data of held source editing material contents which are the held primary contents, for held source editing material contents which are the source editing material contents included in the held primary contents, and playback signal processing for actual content data of corresponding sample contents regarding the lacking primary contents;

The server device further includes a storage unit configured to store the sample contents; and a transmission unit configured to transmit to the content playing device the sample contents which the sample content obtaining unit are to obtain, from the sample contents stored in the storage unit, by communication via a communication network.

With the above-described configurations, subsidiary contents are the object of playback. A subsidiary content is created by secondary usage of one or more contents, and is a file of a structure having playback control information which instructs playback regarding actual content data which source editing material contents have. Accordingly, playback of the subsidiary content is performed by executing playing signal processing regarding actual content data of the source editing material contents following instructions described in the playback control information, as a rule.

However, in a case wherein the user is found to not have a primary content serving as a source editing material (lacking primary content), and the content is unplayable in a complete form due to this, a sample content having sample material corresponding to the lacking primary content is obtained from the server device or the like.

At the time of playing processing of the subsidiary content, playback signal processing of the actual content data of the held source editing material content currently managed as held primary contents is executed with regard to held source editing material content which the user is deemed to have, and as for lacking primary contents, playback signal processing of the actual content data of the corresponding sample content is performed. Accordingly, in the playback which is humanly recognizable, the portion corresponding to the lacking primary content has been replaced with the images and audio of the sample content.

With the above configurations, playback of subsidiary content is performed including sample content, so the content of contents can be viewed/listened to closer to a complete state can be performed for example, even of all primary contents for playing the subsidiary content (source editing content) is not available. This means that the user does not have to obtain all primary contents for playing the subsidiary content beforehand, thereby alleviating the burden on the user.

BRIEF DESCRIPTION OF THE DRAWINGS

FIG. 3 is a diagram schematically illustrating the flow of subsidiary content creation according to the embodiment;

FIG. 4 is a diagram schematically illustrating the flow of subsidiary content playing according to the embodiment;

FIG. 6 is a diagram illustrating an internal configuration example of a primary content server;

FIG. 16 is a diagram illustrating a structural example of used source editing material content information and used editing material content information in a subsidiary content playback control file;

FIG. 17 is a diagram illustrating an example of what is in playback control information in a subsidiary content in a subsidiary content file;

DESCRIPTION OF THE PREFERRED EMBODIMENTS

Figure 1:
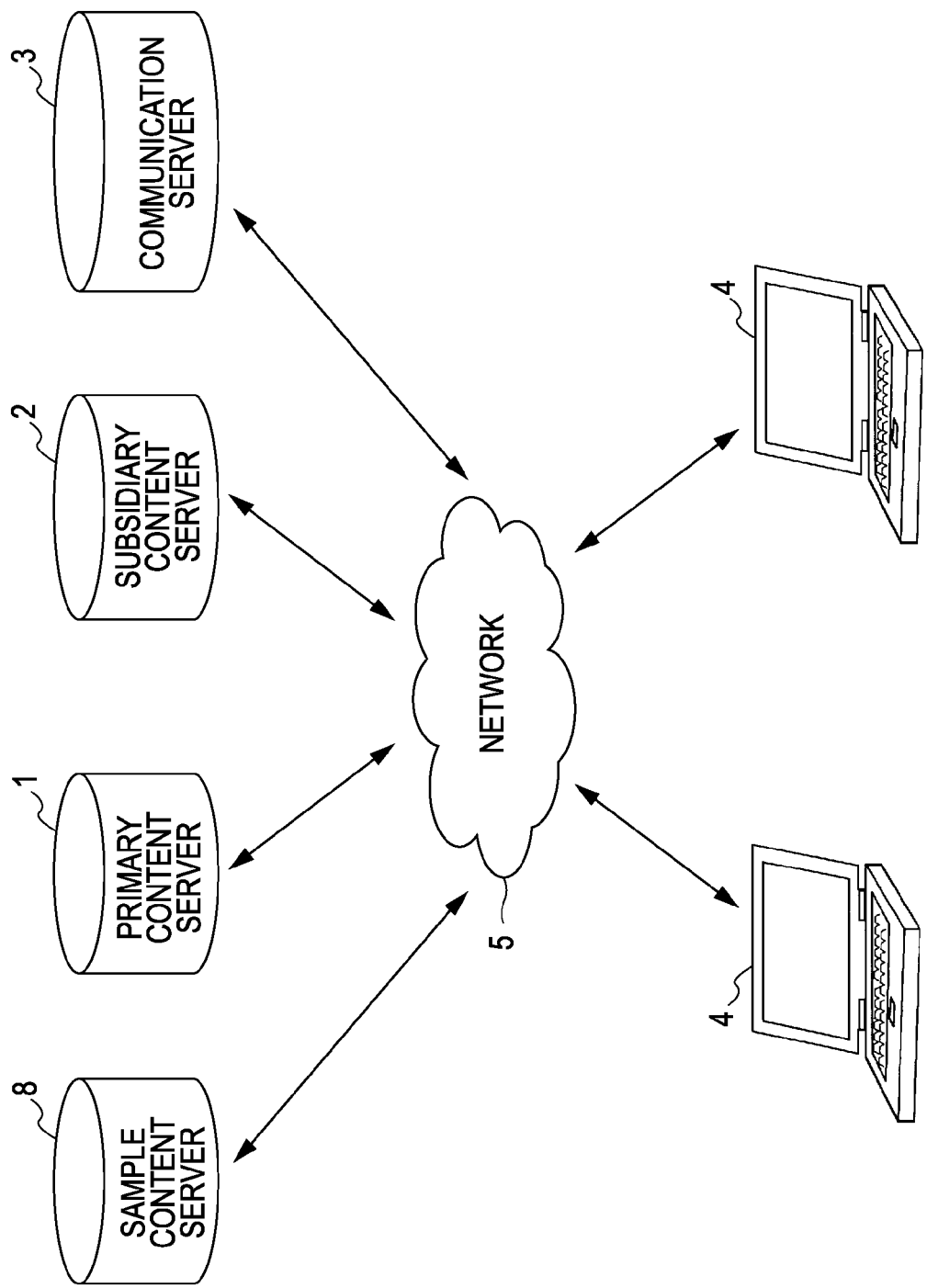
FIG. 1 is a diagram illustrating a configuration example of a content creating/sharing system corresponding to an embodiment of the present invention.

FIG. 1 illustrates a configuration example of a content creating/sharing system according to an embodiment of the present invention. Note that the content creating/sharing system according to the present embodiment handles primary content files, subsidiary content files, and sample content files, as content files, as will be described later. In the following, content files will be referred to simply as "content files" in the event that primary content files, subsidiary content files, and sample content files do not have to be distinguished. Also, in the case of describing contents in accordance with abstract concepts, primary content files will also be referred to as "primary contents", subsidiary content files will also be referred to as "subsidiary contents", and sample content files will also be referred to as "sample contents". Moreover, contents will be referred to simply as "contents" in the event that primary contents, subsidiary contents, and sample contents do not have to be distinguished.

As shown in this drawing, the content creating/sharing system according to the present embodiment can first be viewed as being formed by connecting a primary content server 1, a subsidiary content server 2, a communication server 3, and a great number of user terminal devices 4, connected by a network (communication network) 5. The content creating/sharing system according to the present embodiment realizes a content creating/sharing system by such a device configuration. That is to say, so-called content distribution (distribution of primary contents) and sharing of contents created by users (subsidiary contents) among users, on a network, are realized.

Note that "contents" as used here primarily refer to audio contents corresponding to music, songs, and the like, or video contents which is moving images. Further, the content types of video contents may be considered to include still images, such as photographs and the like. Also, document data, programs to be executed by the information processing device, and so forth, can be handled as contents.

The primary content server 1 holds primary contents. To this end, a great number of content data are stored and managed in a database, in a predetermined format, as primary content files. The primary content server 1 is configured so as to be capable of distributing the primary content files held therein. That is to say, the primary content server 1 is configured so as to externally transmit data which is specified primary contents to the requesting user terminal devices 4, in response to download requests from the user terminal devices 4 via the network. Note that the primary contents here are, for example, videos or tunes or the like which artists and the like have created, provided from an affiliated record label.

The subsidiary content server 2 holds subsidiary contents, and to this end is capable of storing and managing data of a great number of subsidiary content files, which is data serving as subsidiary contents, in a database. As described later, a subsidiary content file is uploaded from a user terminal device 4 to the subsidiary content server 2 via the network. The subsidiary content server 2 stores the subsidiary content file uploaded in this way, handling as subsidiary contents. Also, the subsidiary content server 2 is capable of distributing subsidiary content, i.e., a specified subsidiary content file is transmitted and output by the subsidiary content server 2 to a requesting user terminal device 4, in response to a download request from the user terminal device 4 via the network.

The communication server 3 is a server having functions for providing inter-user communication services, such as for example, SNS (Social Networking Service), services for individuals to put information out which is also widely recognized as CGM (Consumer Generated Media) such as blogs, and so forth.

The sample content server 8 holds corresponding sample contents for each primary content held by the primary content server 1. To this end, sample content files are held and managed as a database, for example. As described later, the sample contents can be distributed. That is to say, in response to a request from a user terminal device 4, data of specified sample content files can be transmitted to the requesting user terminal device 4.

Note that "sample contents" are referred to here mean contents which have a sample content serving as a sample of corresponding primary contents. If we view as the corresponding primary content as being a content having the complete content thereof, the sample content is a content having content which is at least part of the corresponding primary content, for example, such that an overview can be comprehended. For example, one idea would be to have content corresponding to a partial playing time of the total playing time of the content of the primary content, or in the case of moving images or the like, a content where every few frames are extracted from the corresponding primary content and presented in order as a slide show, for example.

Also, while primary contents are pay contents as a rule, distributed sample contents are free, as a rule. That is to say, the user of the user terminal device 4 does not have to pay for receiving data of sample contents form the sample content server 8 and playing it.

A user terminal device 4 is a network device which a general user uses, and actually is a personal computer provided with network communication functions such as LAN or the like, for example. These user terminal devices 4 have installed an application program serving as a content creating/sharing application 100, as described later. The user operates this content creating/sharing application 100, and thus is enabled to perform such as downloading primary content files from the primary content server 1, creating new subsidiary content due to editing work using the downloaded primary content file (and subsidiary content file), uploading the created subsidiary content file to the subsidiary content server 2, downloading subsidiary content files from the subsidiary content server 2, using SNS services, writing/browsing blogs using the communication server 3, and so on.

Next, an example of basic operations relating to content distribution, of the content creating/sharing system according to the present embodiment assuming the configuration shown in FIG. 1 described above, will be described with reference to FIG. 2, following a basic usage form example by a user of a user terminal device 4. Note that in the description in FIG. 2, description will be made following the numbers of procedures and operations indicated by alphanumeric characters in the brackets [ ]. Also, here, user terminal devices 4A and 4B are shown as being used by two users A and B, respectively, as user terminal devices 4. In this drawing, the network 5 which exists between the primary content server 1, subsidiary content server 2, communication server 3, sample content server 8, and user terminal devices 4 is omitted from the drawings.
Procedure 1

First, the user A accesses a content download site on the primary content server 1 with the user terminal device 4A (content creating/sharing application 100), and then searches the content download side for primary contents which the user wants to download, and performs operations for downloading the searched primary contents. In response to this operation, the user terminal device 4A transmits a download request to the primary content server 1.

Now, we will say that with the content creating/sharing system according to the present embodiment, the downloading of primary contents is basically charged for, with the user A performing proper purchasing procedures at the time of transmitting a download request to the primary content server 1. As far as purchasing procedures go, for example, this may be payment procedures for charges set individually in increments of contents or in increments of albums or the like, or may be subscriptions which have become widespread as of recent. Also, an arrangement may be conceived wherein primary contents are provided free of charge, an in this case, there are no purchasing procedures for the user A.

Upon receiving a download request as described above, the primary content server 1 first performs authentication regarding the requesting user for example, and so forth, and determines whether or not this is a legitimate download request. In the event that determination is made that this is a legitimate download, the primary contents (primary content file) specified at the time of the download request are searched for from the primary contents stored within itself, and data of the file serving as the searched primary contents is transmitted to the requesting user terminal device 4.

Note that the actual entity of the primary content file which the primary content server 1 stores while managing in a database here is of a structure wherein main information serving as actual content data has header information attached thereto. "Actual content data" in this case refers to audio data, moving image data, and still image data according to a predetermined format (data for playing the actual content of the primary contents), as what the content of the contents is. That is to say, the primary content data according to the present embodiment is that from which contents can be played by performing audio signal processing and video signal processing and so forth. Also, header information includes, besides a unique content ID (content identifier) for each content file, various types of metadata (tile, artist, title of album to which the data belongs, genre, data format, data size, etc.).

The primary content data transmitted from the primary content server 1 as described above is received at the user terminal device 4A. The user terminal device 4A (content creating/sharing application 100) stores and saves this received primary content data in a storage medium such as an internal HDD or the like. The content creating/sharing application 100 has functions for managing the primary content stored and saved in this way according to a predetermined form based on the header information for example, and executing playback control in accordance with user operations.

Thus, with this arrangement, primary content data stored in the primary content server 1 can be downloaded to user terminal devices 4, by being purchased by the user as a general principle. That is to say, for procedure 1, so-called content distribution is performed.

Note that the primary content data stored and saved at the user terminal device 4A can be played by the content creating/sharing application 100, and output as images, audio, etc., with an AV (Audio-Visual) device or the like connected to the user terminal device 4A, for example.

Procedure 2

Now, generally, with content distribution via network, usage of contents following downloading is restricted to use such as playback, with a certain level of copy restrictions of data being provided. In other words, a user who has obtained contents by downloading is normally only permitted usage within a certain range, and is not provided with rights to create new contents as secondary creations by performing editing based on the obtained audio contents that have been acquired, for example.

In comparison to this, with the present embodiment, the primary content is content regarding which using as material for secondary creation within a range set beforehand (secondary usage, secondary editing) has been permitted, as a matter of principle. Note that secondary usage of the primary content in the present embodiment is set within the range of rights which the writer of the primary content has authorized.

The content creating/sharing application 100 is capable of creating audio contents as a new tune, by executing editing processing in accordance with user operations to perform secondary usage of the primary contents managed in itself (locally stored and saved) as editing material. Also, at the time of editing such contents for example, plug-in data corresponding to predetermined special effects provided at an effect database 6 can be obtained, and editing performed using this. Also, in the same way, material such as audio, images, etc., provided at a material database 7 can be obtained, and editing performed by adding this. Note that the effect database 6 and material database 7 may be situated on a network, or may exist locally on the user terminal device 4A.

With the present embodiment, contents created in this way are called subsidiary contents, and are distinguished from primary contents. As for the procedure 2, a certain subsidiary content is created by operating operations as to the user terminal device 4A on which the content creating/sharing application 100 is running.

Note that the actual entity of the data serving as the subsidiary content created by this procedure 2 is not the digital audio data and video data having the tune content as with the primary content, but rather is generated with playback control information. That is to say, this is playback control information describing specification of effects (special effects), such as instructions of what portion of the digital audio data serving as the secondarily used primary contents (editing material contents) is to be played and output at which timing.

Now, FIG. 5 illustrates a concept of creating subsidiary contents with the content creating/sharing application 100. As schematically illustrated in FIG. 5, the editing material contents A, B, and C which are objects of secondary use are used, and the user performs editing operations as to the content creating/sharing application 100 which reflect the intent of editing of the user. The content creating/sharing application 100 performs editing processing corresponding to the editing operations, and creates and outputs a subsidiary content file as a result. The structure of the subsidiary content file created in this way has the above-described playback control information as the main entity of the data.

The subsidiary content data serving as this playback control information (i.e., the subsidiary content playback control information) can be made markedly smaller in data size as compared to video data or audio data or the like, for example. Accordingly, the storage capacity of the storage medium such as the HDD or the like to store the subsidiary content data at the subsidiary content server 2 can be conserved and effectively used. Also, the amount of transmitted data is smaller at the time of transmission/reception of the subsidiary content data on the network, and accordingly does not make traffic heavier, for example.

Performing editing with already-existing contents as material, as with the secondary editing with the present embodiment, to create a secondary work as a new content, is called sampling, mash-up, and so forth, with professional musicians and the like also often performing this. In light of such, it is naturally conceivable that there is desire and demand of general people to create contents as secondary works in the same way. However, in reality, it is extremely difficult for general people to create contents as secondary works upon having properly cleared copyright issues.

Accordingly, as for the content creating/sharing system according to the present embodiment, an attempt has been made to increase the entertainment nature for the user, by first enabling general users to legally perform secondary editing using distributed contents.

To this end, the primary contents according to the present embodiment have been positioned as contents regarding which a user which has downloaded (purchased) is permitted to use secondarily in the range of rights which the copyright holder has authorized. That is to say, the content distribution service with the primary content server 1 according to the present embodiment is for distributing contents regarding which secondary usage has been proactively permitted. However, in the case of the present embodiment, the editing work which is secondary use of primary contents should be limited to user operations at the content creating/sharing application 100 developed for the content creating/sharing system according to the present invention at the least, and should be arranged such that the editing work is not performed by other editing software or the like unrelated to the content creating/sharing system according to the present embodiment.

Procedure 3

The data of the subsidiary content file created by the user A as described in Procedure 2 above is saved only at the user terminal device 4A, with playback processing being performed by the playback functions of the content creating/sharing application 100 as described later with FIG. 4, and images/audio of the contents can be played as the subsidiary content.

With this in mind, the present embodiment further enables users who have the services of the content creating/sharing application 100 according to the present embodiment to share the subsidiary contents created by users, by making public on a network.

Now, let us say that the user A desires to share subsidiary contents created by the above Procedure 2. Accordingly, the user A performs predetermined operations as to the content creating/sharing application 100, so as to upload the data of the subsidiary content file created by the Procedure 2 to the subsidiary content server 2. This is Procedure 3.

Procedure 4

The subsidiary content server 2 saves the subsidiary content file transmitted as an upload as described above, so as to be newly registered in a database. At this time, the subsidiary content server 2 sets the saving location thereof (e.g., represented by an address such as a URL (Uniform Resource Locator)), and then performs saving processing of the subsidiary content file and registration thereof in the database.

Note that the subsidiary content server 2 has publishing functions with regard to the subsidiary content registered in the database. That is to say, the subsidiary content registered in Procedure 4 is subsequently published at the subsidiary content server 2, can be downloaded in response to download requests from the user terminal device 4 (content creating/sharing application 100).

Procedure 5

Upon saving and managing the subsidiary content file as described above, the subsidiary content server 2 transmits, to the upload requesting user terminal device 4A, an address indicating the saving location of the subsidiary content (subsidiary content file) that has been uploaded (saving location address), to notify the saving location thereof.

The content creating/sharing application 100 of the user terminal device 4A receives the above saving location address, and stores and saves, and manages this in a predetermined storage medium. The user A can, at any time, output the saving location address of the subsidiary content which he/she has uploaded by Procedure 2, by performing a predetermined operation as to the content creating/sharing application 100.

Procedure 6

As described earlier, the subsidiary content server 2 has a publishing function regarding the subsidiary contents registered in the database. Accordingly, the subsidiary content which the user A has created and uploaded this time can be browsed by users of an indeterminate number of user terminal devices 4 (content creating/sharing applications 100) accessing the content publishing site provided by the subsidiary content server 2, as a general principle. Also, with the present embodiment, the user terminal devices 4 of all users can download desired subsidiary contents, as a general principle. With this understanding, the user A which has obtained the saving location address in Procedure 5 can announce to other users in several ways that his own subsidiary contents have been published at the subsidiary content server 2. Procedure 6 corresponds to one of the publishing announcement methods, and is carried out by accessing the communication server 3 as shown in the drawing, and writing to his own page in an SNS, or his own blog or the like, for example, that the subsidiary contents created by himself have been published. At this time, the URL serving as the saving location address obtained in Procedure 5 is also copied in so as to be written in.

Procedure 7

Upon a user B for example operating the content creating/sharing application 100 installed in the user terminal device 4B after the user A has written in as described above with Procedure 6 and accessing and browsing the page of the user A in the SNS or the blog of the user A, he/she knows that subsidiary content of the user A has been newly published. That is to say, in this case, the user B has indirectly received the announcement regarding the new publishing of the subsidiary content created by the user A, via the SNS or blog. Procedure 7 indicates such indirect announcement of subsidiary content publishing being performed.

Procedure 8

Procedure 8 will be given as another way for publishing announcement. As for this Procedure 8, the user B side is notified that the subsidiary content created by the user A has been disclosed by creating and transmitting mail using a mail function provided to the SNS, for example. This is a more direct form of announcement, as compared to the announcement according to the flow of the above-described Procedure 6 and Procedure 7.

Also, in the event of announcing by e-mail and so forth in this way, the saving location address of the subsidiary content is copied into the body for example, so as to be listed.

Procedure 9

In this way, the user B can indirectly or directly receive announcement and know that the subsidiary content created by the user A has been newly published. In the event that the user B desires to enjoy the subsidiary content of the user A that has been newly published, first, the subsidiary content is downloaded by the content creating/sharing application 100. This is Procedure 9.

At the time of downloading the subsidiary content, a clicking operation or the like is performed as to the saving location address shown as a link in the body of the SNS diary page or blog, for example. Note that at the time of writing to an SNS diary page or blog, in the event the address information such as a URL is written in, this text string portion is presented as a link.

In response to performing a clicking operation as to the saving location address as described above, the content creating/sharing application 100 accesses this saving location address. That is to say, of the addresses on the subsidiary content server 2, an address indicating the location where the file of the subsidiary content which the user A has created and published (subsidiary content file) has been saved, is accessed. The subsidiary content file saved at that saving location is then sent out to the user terminal device 4B. The subsidiary content file set out in this way as received at the user terminal device 4B, and saving and management is performed under control of the content creating/sharing application 100. Accordingly, subsidiary content is downloaded.
Procedure 10

Upon the subsidiary content of the user A being saved and managed as described above, playing of the subsidiary content by the content creating/sharing application 100 of the user terminal device 4B becomes available. Procedure 10 is a procedure for playing subsidiary content file, so that the content of the subsidiary contents are output as video, sound, and so forth, in accordance with playback instruction operations as to the content creating/sharing application 100 by the user B.

FIG. 4 shows a playback concept of subsidiary contents with the content creating/sharing application 100. At the time of playing the subsidiary content, first, the content creating/sharing application 100 performs interpretation processing of the playback control information of the subsidiary content file which is the actual data. As a result of this interpretation, the content creating/sharing application 100 can recognize first, for example, which primary content file has the actual content data to be played (source editing material content), and also in the playing sequence, which portion of the actual content data (video data, audio data, etc.) of the source editing material contents have been used in what manner at what playing time, and so forth, for example.

In this diagram, an example of results is shown in a case that recognition has been made that source editing material contents A, B, and C have been used. Following the recognition results thereof, the content creating/sharing application 100 uses the actual contents of the primary content files serving as the source editing material contents A, B, and C, to execute playback control. Consequently, the content of the contents serving as the subsidiary content is played as images and sound.

According to the description of FIG. 4 above, playing of the subsidiary content uses the actual content data of the material package file (source editing material content) used for creating the subsidiary content. Now, in this case, in order to play subsidiary content file, the data of the source editing material contents has to exist at the same local location as the content creating/sharing application 100, however temporarily. Accordingly, in the event that the source editing material contents are not locally saved as a primary content file at the time of attempting to play the subsidiary content, this should be obtained locally.
Procedure 11

Accordingly, in such a case as described above, procedures are performed for downloading and acquiring any editing material contents which are not locally available. Procedure 11 in FIG. 2 is a procedure to be performed to this end in the process of playing contents with Procedure 10.

As can be understood from the description so far, the source editing material contents are actual content data, so as a principle, the source editing material contents are primary contents. Accordingly, in Procedure 11, the primary content server 1 is accessed by the user terminal device 4B (content creating/sharing application 100) and primary contents used for playing the subsidiary content in this Procedure 10 but not existing locally are downloaded. Due to this downloading, the source editing material contents used for playing the subsidiary content all exist locally, and playback output can be properly executed as described with FIG. 4.

Note that several forms of data of the primary contents existing locally due to the downloading in Procedure 11 can be conceived. First, a form can be conceived wherein this is made to exist locally, in a state of being stored in saved as to an auxiliary storage device such as an HDD, in the same way as with the case of a normal download according to Procedure 1. As for another, a form can be conceived wherein this is temporarily held in a main storage device such as RAM, and is erased in response to the content creating/sharing application 100 no longer being in a state wherein the playback operation of the subsidiary content can be performed, for example. While primary contents have been described as being basically charged for, for example, operations can be conceived wherein in the case of temporary storage, these are free of charge, or fees are set cheaper than normal downloads, or the like.

Figure 2:
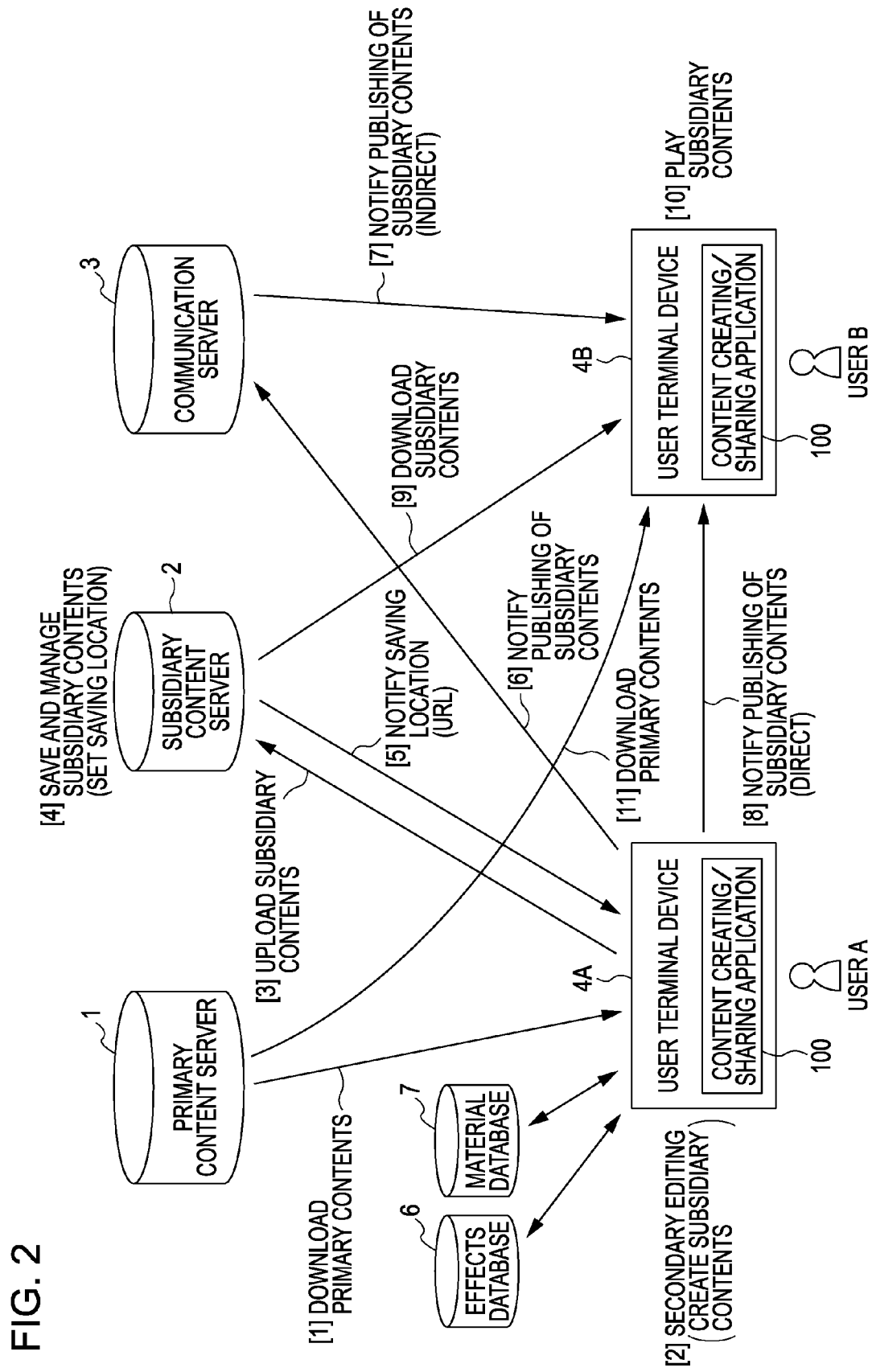
FIG. 2 is a diagram illustrating a basic usage form of a content creating/sharing system according to an embodiment of the present invention, and procedure examples of system operations corresponding thereto.

Also, according to the description of FIG. 2 above, with creating of subsidiary contents according to the present embodiment, primary contents are directly used as the contents of editing material (editing material contents), in a secondary usage manner. That is to say, the editing material contents in this case are primary contents of which the actual content data has to be used at the time of playing (also referred to as "source editing material contents").

However, not only primary contents but also subsidiary contents can be included as the editing material contents which are subjected to secondary usage in the present embodiment. This point will be supplemented with reference to FIGS. 5A through 5C, which each illustrate cases of creating one subsidiary content by editing with secondary usage of two editing material contents.

Figure 5A:
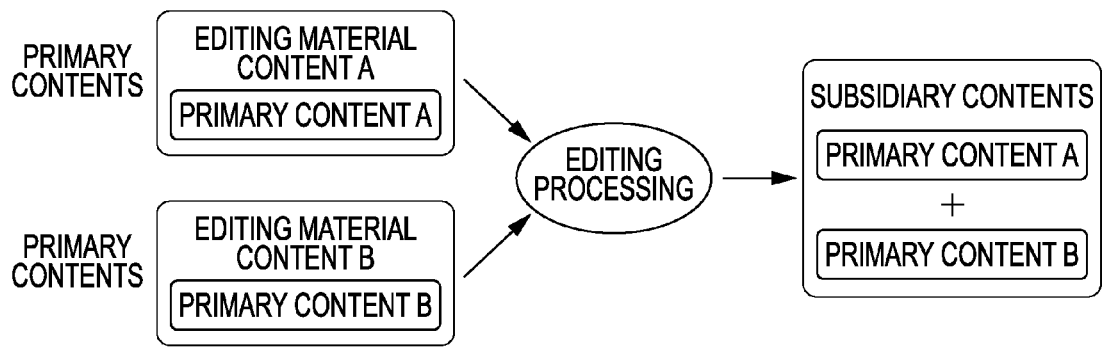
FIGS. 5A through 5C are diagrams illustrating a usage form example of editing material contents at the time of creating a subsidiary content.

First, FIG. 5A illustrates a case wherein the editing material contents A and B are each primary contents, in the same way as with the example of creating subsidiary content described with FIG. 2. That is to say, this shows creating of subsidiary content by executing editing processing with a primary content A taken as editing material content A, and a primary content B which is a different primary content taken as editing material content B. The subsidiary content in this case includes at least a part of the primary content A and primary content B as for the contents thereof, as shown in the drawing. That is to say, the primary contents A and B are used as the contents which are the original editing material (i.e., source editing material contents).

Figure 5B:
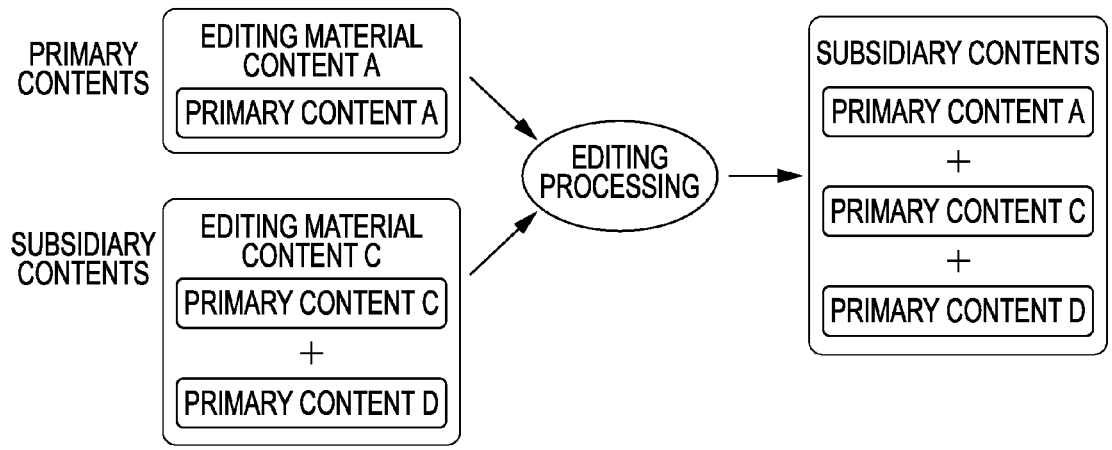

FIG. 5B illustrates creating a subsidiary content by editing with secondary usage of the editing material content A which is the same primary content as in FIG. 5A, and editing material content C which is subsidiary content created using primary contents C and D secondarily. The subsidiary content in this case includes at least a part of the primary content A included in the editing material content A, and at least a part of each of the primary contents included in the editing material content C, as for the content of the contents thereof. That is to say, the primary contents A, C and D are used as the original editing material content, and accordingly, in the event of playing the subsidiary content shown in FIG. 5B here, the primary contents A, D, and D should be locally situated.

Figure 5C:
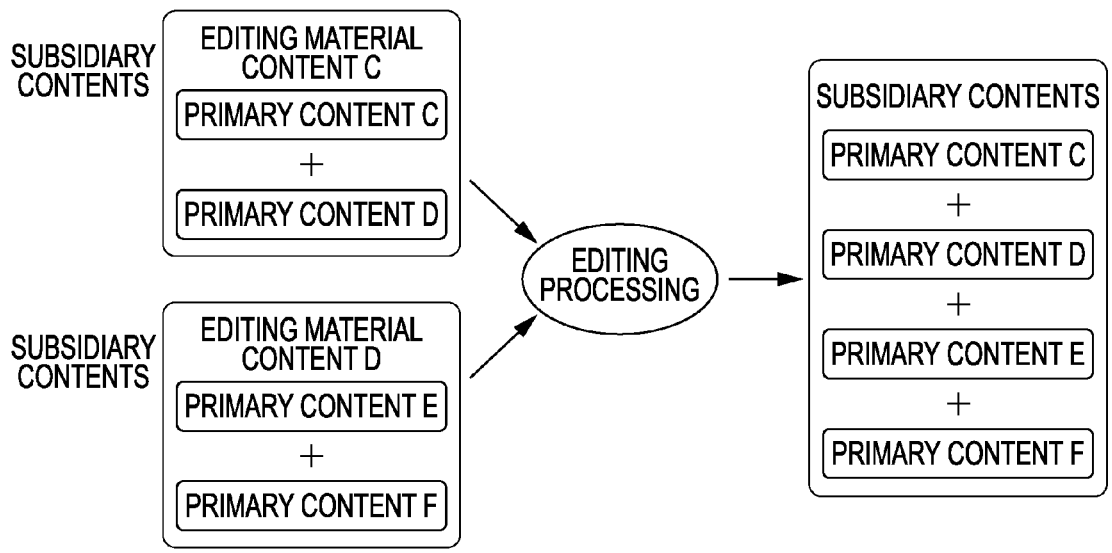

FIG. 5C illustrates creating a subsidiary content by secondary usage of the two editing material contents C and D which are subsidiary contents. The subsidiary content newly created in this case includes at least a part of each of the primary contents C and D included in the editing material content C, and a part of each of the primary contents E and F included in the editing material content D, as for the content of the contents thereof. Accordingly, the primary contents C, D, E, and F should be locally situated in the event of playing the subsidiary content shown in FIG. 5C.

Also, in the event of using subsidiary contents as editing material contents for creating subsidiary content as in the above FIGS. 5B and 5C, first, the user performs download for example, and stores and saves at the user terminal device 4, in order to situate the subsidiary content serving as the editing material contents locally, in the same way as with handling primary content as editing material content.

Also, in the event of the subsidiary content server 2 performing transmission of subsidiary content data in response to the download request for subsidiary content, in according with Procedure 9 in FIG. 2, the subsidiary content is encrypted. This encryption can be decrypted by an authorized content creating/sharing application 100, but the content creating/sharing application 100 is arranged to operate such that only subsidiary content data decrypted by this encryption processing is played, and subsidiary content data not encrypted to begin with for example, or subsidiary content data encrypted by another format or algorithm, is not played. That is to say, the content creating/sharing application 100 only plays that downloaded and obtained from the subsidiary content server 2 with regard to externally-obtained subsidiary content data.

Accordingly, for example, even in the event that users directly exchange subsidiary content files between user terminal devices by direct communication such as P2P (Peer-to-Peer) network communication or e-mail file attachment or FTP (File Transport Protocol) or the like, or by direct exchange using removable media, files obtained by users in this way will not play properly since there is no encryption by the subsidiary content server 2. That is to say, with the present embodiment, subsidiary content of others will not play properly unless downloaded from the subsidiary content server 2. Accordingly, with the content creating/sharing system according to the present embodiment, circulation and reproduction of illegal subsidiary contents violating copyrights over the network is avoided. Thus, protection of the rights of copyright holders of the primary contents and subsidiary contents can be implemented.

As can be understood from the description in FIGS. 2 through 5C, with the content creating/sharing system according to the present embodiment, first, primary contents are downloadable. That is to say, users can download (purchase) and enjoy contents which they like by normal content distribution. Based on this, usage rights are set whereby secondary usage to take the primary contents as editing materials is enabled, so users can perform editing with the primary contents as materials and create their own works. Further, subsidiary contents which are works created in this way can be publicly published using communication techniques with CGM such as SNSs and blogs and so forth. That is to say, general users can edit contents with copyrights as material and create new contents (subsidiary contents) and further publicly publish the subsidiary contents, in a proper manner, which has heretofore been considered legally difficult due to problems such as copyrights and so forth.

Also, with the present embodiment, the actual entity of the subsidiary contents are playback control information, formed including at least description instructing playing of primary contents which are the original editing material used by the subsidiary contents.

The content creating/sharing application 100 has playback functions of the subsidiary content, but also has editing functions for creating the subsidiary content. Accordingly, as a form of playback of the subsidiary contents, the content creating/sharing application 100 can not only execute processing for simple audio playback, but also reflect the editing history of the subsidiary content being played in the user interface of the editing function described above, for example. That is to say, as a benefit of the actual entity of the subsidiary content being taken as the playback control information, the user can use the editing functions of the content creating/sharing application 100 to find out in detail how the downloaded subsidiary content has been edited.

Next, an example of a technical configuration for realizing the operations as the content creating/sharing system according to the present embodiment described so far, will be described.

First, FIG. 6 illustrates an internal configuration example of the primary content server 1. As shown in this drawing, the primary content server 1 includes a control unit 11, a storage unit 12, an authentication processing unit 13, a search processing unit 14, a database management unit 15, a settlement processing unit 16, an encryption processing unit 17, and a network interface 18.

The control unit 11 is a member which centrally executes various types of control processing at the primary content server 1, and is configured having a hardware configuration equivalent to the center of a computer system, formed of, for example, a CPU (Central Processing Unit), RAM (main storage device), and so forth.

The storage unit 12 is configured having an HDD or the like for example, and stores a primary content database 12a. The primary content database 12a is information increments wherein data files serving as primary contents to be distributed have been databased.

The authentication processing unit 13 executes predetermined authentication processing regarding whether a valid user or not, in the event of a download request having been made for example, using the user ID and password and the like included in that request. Only in the event that the authentication processing results are OK is a primary content transmitted in response to the request.

The search processing unit 14 is a member which cooperates with the database management unit 15 to access the primary content database 12a and execute processing for searching for intended primary contents.

The database management unit 15 performs management with regard to the primary content database 12a. For example, in the event that new primary contents are supplied, the new primary contents are registered to the primary content database 12a which is updated in response thereto. Also, in the event of deleting primary contents, deletion of the primary contents and updating of the database correspondingly is performed in the same way.

The settlement processing unit 16 executes processing such as settlement as to payment of charges at the user side, relating to pay primary contents.

The encryption processing unit 17 is a member which executes processing for subjecting primary contents to be transmitted from the primary content server 1 to a user terminal device 4 to predetermined encryption.

The network interface 18 is a member for performing communication via the network 5, and reception of download requests and corresponding transmission of primary contents for example, are realized by the network interface 18 executing communication processing in accordance with the control of the control unit 11.

Figure 7:
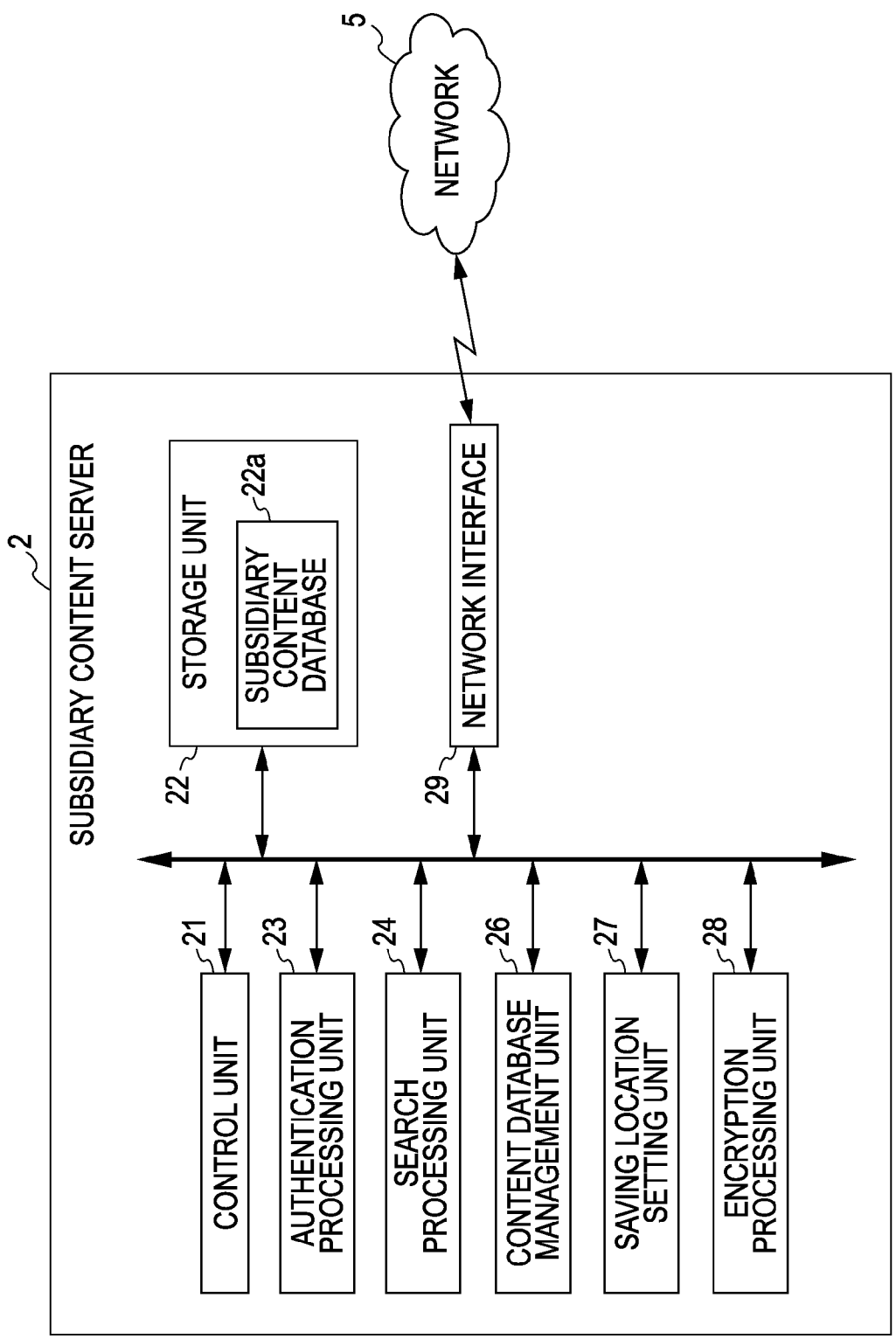
FIG. 7 is a diagram illustrating an internal configuration example of a subsidiary content server.

FIG. 7 illustrates an internal configuration example of the subsidiary content server 2. Here, the subsidiary content server 2 has a control unit 21, a storage unit 22, an authentication processing unit 23, a search processing unit 24, a recommended content extraction processing unit 25, a content database management unit 26, a saving location setting processing unit 27, an encryption processing unit 27, and a network interface 55.

The control unit 21 is a member which centrally executes various types of control processing in the subsidiary content server 2. This also has a hardware configuration equivalent to the center of a computer system, formed of, for example, a CPU, RAM (main storage device), and so forth.

The storage unit 22 is configured having an HDD or the like for example, and stores a subsidiary content database 22*a*. The subsidiary content database 22*a* is information increments wherein subsidiary content files, have been databased.

The authentication processing unit 23 executes predetermined authentication processing regarding whether a valid user or not, in the event of a download request for subsidiary content having been made for example, using the user ID and password and the like included in that request.

The search processing unit 24 is a member which cooperates with the content database management unit 26 to access the subsidiary content database 22*a* and execute processing for searching for intended subsidiary contents.

The content database management unit 26 performs management with regard to the subsidiary content database 22*a* in the storage unit 22. For example, in the event that new subsidiary contents (subsidiary content files) are uploaded, the uploaded subsidiary contents are registered to the subsidiary content database 22*a* which is updated in response thereto. Also, in the event of deleting subsidiary contents (subsidiary content files), deletion processing to this end and updating of the database corresponding to the deletion results is performed in the same way.

The encryption processing unit 27 is a member which executes processing for subjecting the subsidiary content data to be transmitted from the subsidiary content server 2 to a user terminal device 4 to predetermined encryption. Also, depending on the system operation, subsidiary content data may be encrypted and transmitted from user terminal devices 4 at the time of uploading subsidiary contents, and in this case, the encryption processing unit 27 is arranged to execute processing for decrypting the encryption thereof as well.

The network interface 55 is a member for performing communication via the network 5. Reception of uploaded subsidiary contents and download requests for example, and transmission of subsidiary content data corresponding to download requests (subsidiary content files) are realized by the network interface 55 executing communication processing in accordance with the control of the control unit 21.

Figure 8:
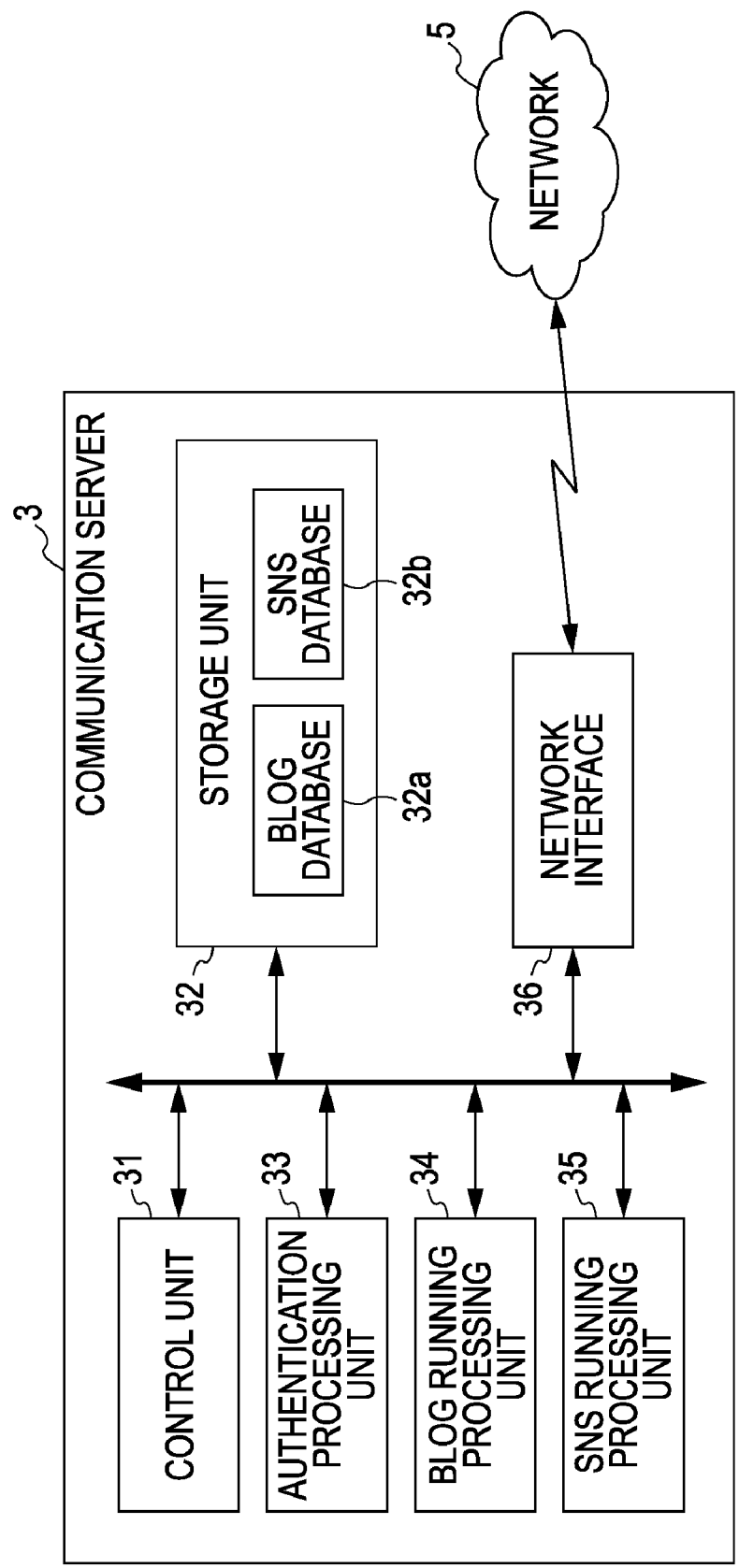
FIG. 8 is a diagram illustrating an internal configuration example of a communication content server.

FIG. 8 illustrates an internal configuration example of the communication server 3. As shown in the drawing, the communication server 3 includes a control unit 31, an a storage unit 32, authentication processing unit 33, a blog running processing unit 34, an SNS running processing unit 35, and a network interface 36. Note that the communication server 3 in this case provides communication services with blogs and SNSs.

The control unit 31 is a member which centrally executes various types of control processing in the communication server 3, and also has a hardware configuration equivalent to the center of a computer system, formed of, for example, a CPU, RAM (main storage device), and so forth.

The storage unit 32 is configured having an HDD or the like for example, and stores a blog database 32*a* and SNS database 32*b*. For example, the blog database 32*a* is information increments wherein data of a blog which the user has started have been databased. The SNS database 32*b* is information increments wherein page contents and the like of each SNS user have been databased.

The authentication processing unit 33 in this case executes authentication processing in response to logins for updating blogs, requests for SNS logins, and so forth, using the user ID and password and the like included in the requests. In the event that the authentication processing results are OK, the above login is successful.

The blog running processing unit 34 executes various types of predetermined processing for properly running a blog. For example, processing is executed such as transmission of blog screen data, transmission of blog posting screens, and so forth, in response to blog access requests from user terminal devices 4, valid blog posting screen requests, and so forth. Also, processing for managing the blog database 32*a*, such as updating the blog database 32*a* such that posts to the blog are reflected, is also executed.

In the same way, the SNS running processing unit 35 executes processing for properly running an SNS, such as processing for transmission of data of a page in response to SNS page access requests and database management beginning with updating the SNS database 32*b* such that posts such as diaries are reflected, and so forth.

The network interface 36 is a member for performing communication via the network 5. This enables transmission of page data in response to access requests for blogs and SNSs, and so forth.

Note that while the communication server 3 is provided corresponding to SNSs and blogs, but separate servers may be configured for SNSs and blogs, for example. Also, a configuration may be made to provide more basic CGM related services which have been widespread even before SNSs and blogs, such personal sites and homepages, for example, whereby individual users can post information other than SNSs and blogs and the like.

Figure 9:
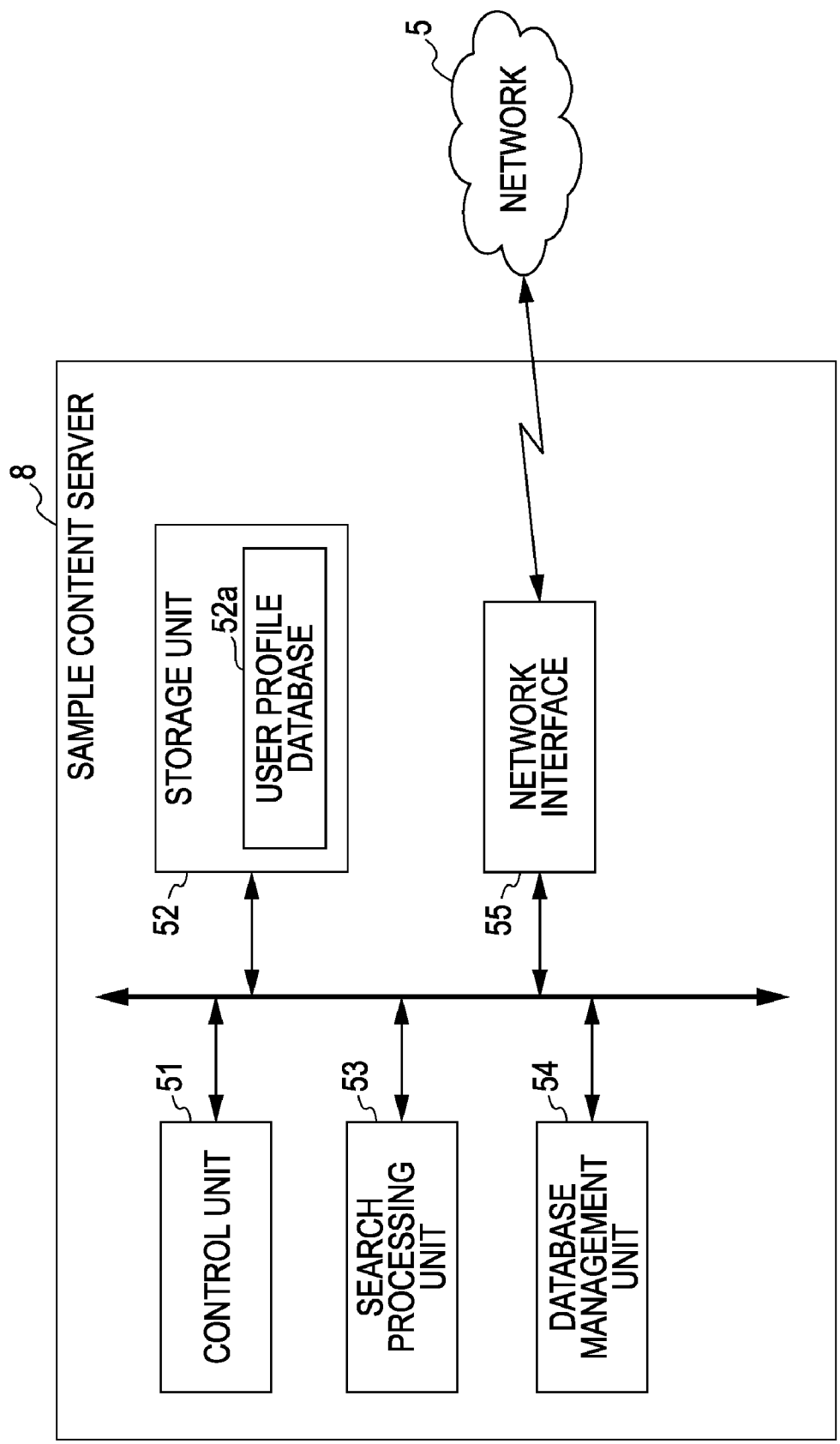
FIG. 9 is a diagram illustrating an internal configuration example of a sample content server.

FIG. 9 illustrates an internal configuration example of the sample content server 8. The sample content server 8 shown here includes a control unit 51, a storage unit 52, a search processing unit 53, a database management unit 54, and a network interface 55.

The control unit 51 is a member which centrally executes various types of control processing of the sample content server 8, and has a hardware configuration equivalent to the center of a computer system, formed of, for example, a CPU, RAM (main storage device), and so forth.

The storage unit 52 is configured having an HDD or the like for example, and stores a sample content database 52*a* as the information stored therein, here. The sample contents are stored and managed in a state of having been registered in the format of the sample content database 52*a*.

The search processing unit 53 collaborates with the database management unit 54 for example, to access the sample content database 52*a* and execute processing for searching intended sample contents therefrom.

The database management unit 54 performs management of the sample content database 52*a*. For example, in the event that a new sample content is uploaded therein corresponding to new registration of a primary content at the primary content server 1, the uploaded sample content is registered in the sample content database 52*a* so as to update the sample content database 52*a*. Also, in the event that a primary content is deleted from the primary content server 1 or the like, the corresponding sample content is deleted from the sample content database 52*a* so as to be consistent, and the sample content database 52*a* is updated.

The network interface 55 is a member for performing communication with the other servers and user terminal devices 4 via the network 5. Communication such as reception of uploaded contents and requests for distribution (transmission), transmission of sample content file data in response to distribution requests, and so forth, is realized by the network interface 55 performing communication processing under control of the control unit 55.

Sample content data can also be transmitted by streaming, as described later. In this case, a streaming server, for example, is used. Though not clearly shown in FIG. 9, a streaming server is to be understood to be configured with the sample content server with the configuration described above.

Figure 10:
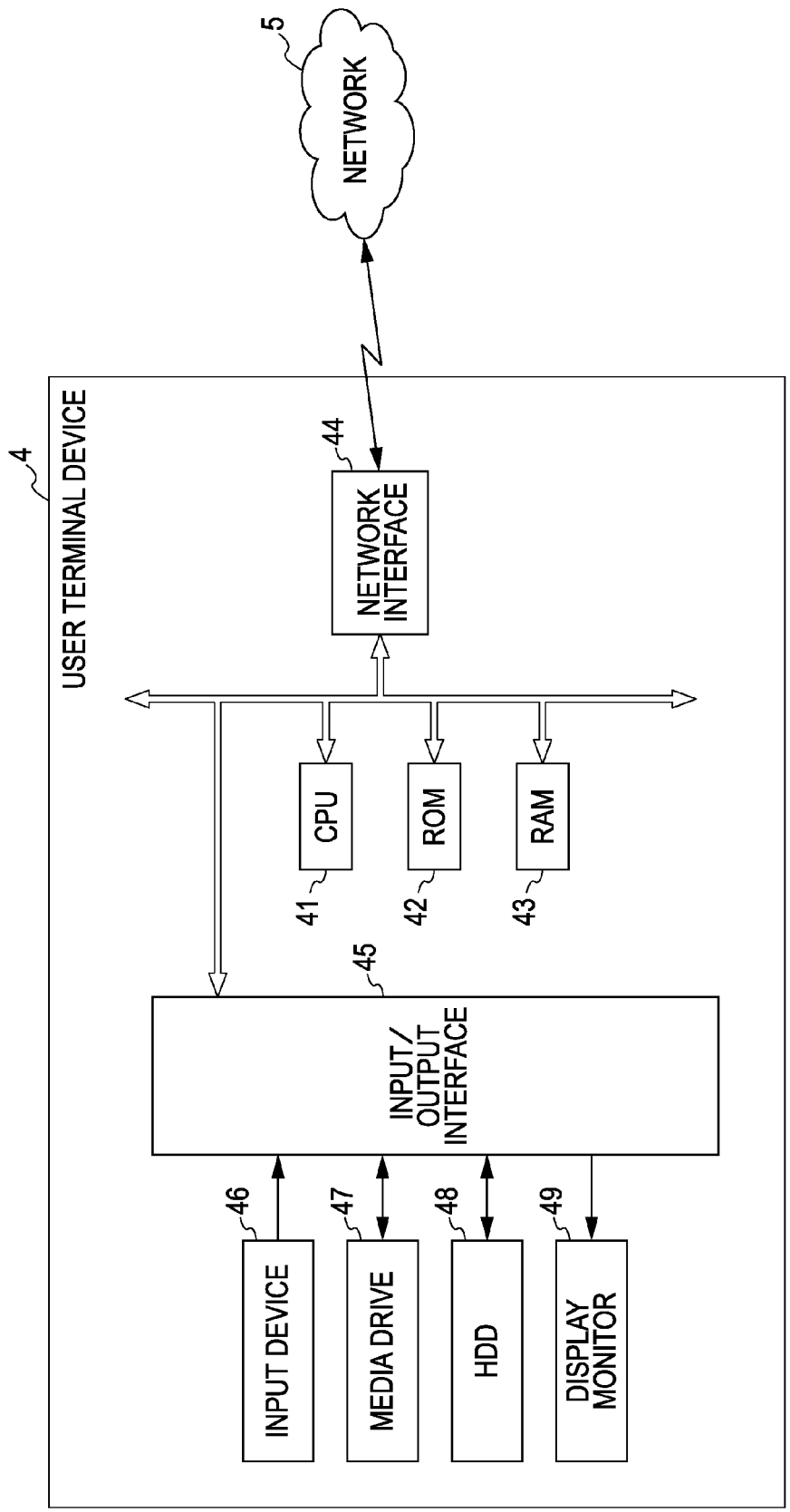
FIG. 10 is a diagram illustrating an internal configuration example of a user terminal device.

FIG. 10 illustrates an internal configuration example of the user terminal device 4. Note that in this case, the hardware serving as the user terminal device 4 is a personal computer.

First, the user terminal device 4 has a network interface 44 in order to perform communication via the network 5. Due to this network interface 44 having been provided, the user terminal device 4 can communication with, for example, the primary content server 1, the subsidiary content server 2, the communication server 3, and other user terminal devices 4 and so forth, via the network 5.

A CPU (Central Processing Unit) 41 is capable of executing various types of processing following an OS (Operating System) and various types of applications programs installed in an HDD (hard disk drive) 48 for example, and programs held in ROM 42. With the present embodiment, an application program serving as the content creating/sharing application 100 is to be installed.

RAM 43 is a work area for the CPU 41, and suitably holds data and programs and the like for the CPU 41 to execute various types of processing.

An input/output interface 45 in this case has an input device 46 which is a keyboard or mouse or the like for example connected thereto, with operation signals being output from the input device 46 being converted into signals suitable for the CPU 41 and output to the CPU 41.

Also, the input/output interface 45 has a media drive 47 connected thereto. This media drive 47 is a drive device configured such that data can be recorded to and played from removable media of a predetermined format.

Also, the input/output interface 45 has connected thereto an HDD 48 having a hard disk as a storage medium. The CPU 41 is arranged so as to be able to record or read out data and programs and the like to and from the hard disk of the hard disk drive 48, via the input/output interface 45.

Also, a display monitor 49 for displaying images is also connected to the input/output interface 45.

Figure 11:
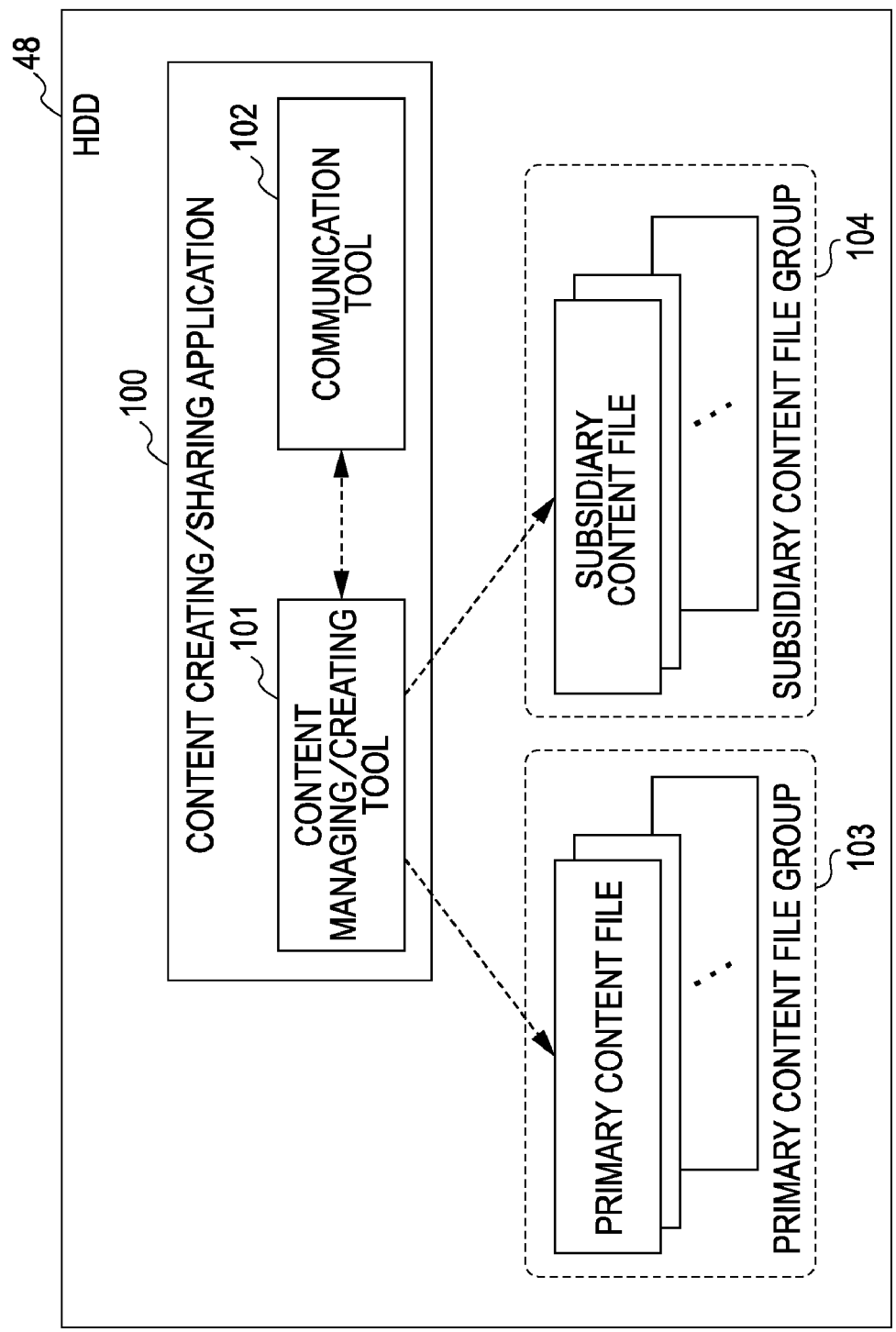
FIG. 11 is a diagram illustrating an example of data contents to be stored in an HDD of the user terminal device.

FIG. 11 illustrates a data content example stored in the HDD 48 with relation to usage of the content creating/sharing system according to the present embodiment.

As shown in this drawing, with relation to the content creating/sharing system according to the present embodiment, first, the content creating/sharing application 100 is stored as data of an application program. Note that storing of the content creating/sharing application 100 as to the HDD 48 is performed by installation processing. Also, as application files, one or more primary content files (primary content file group 103) and one or more subsidiary content files (subsidiary content file group 104) are stored under the control of the content creating/sharing application 100.

The content creating/sharing application 100 in this case can be viewed functionally as being generally configured of a program portion serving as a content managing/creating tool 101 and a program portion serving as a communication tool 102. The content managing/creating tool 101 is arranged to execute downloading of primary content files and subsidiary content files, and file operations with regard to primary content files of the primary content file group 103 and subsidiary content files of the subsidiary content file group 104. Also executed are editing processing in accordance with editing operations, subsidiary content file creating processing in response to editing results, and so forth. The communication tool 102 executes processing for accessing the communication server 3 and operating blogs and SNSs.

Figure 12:
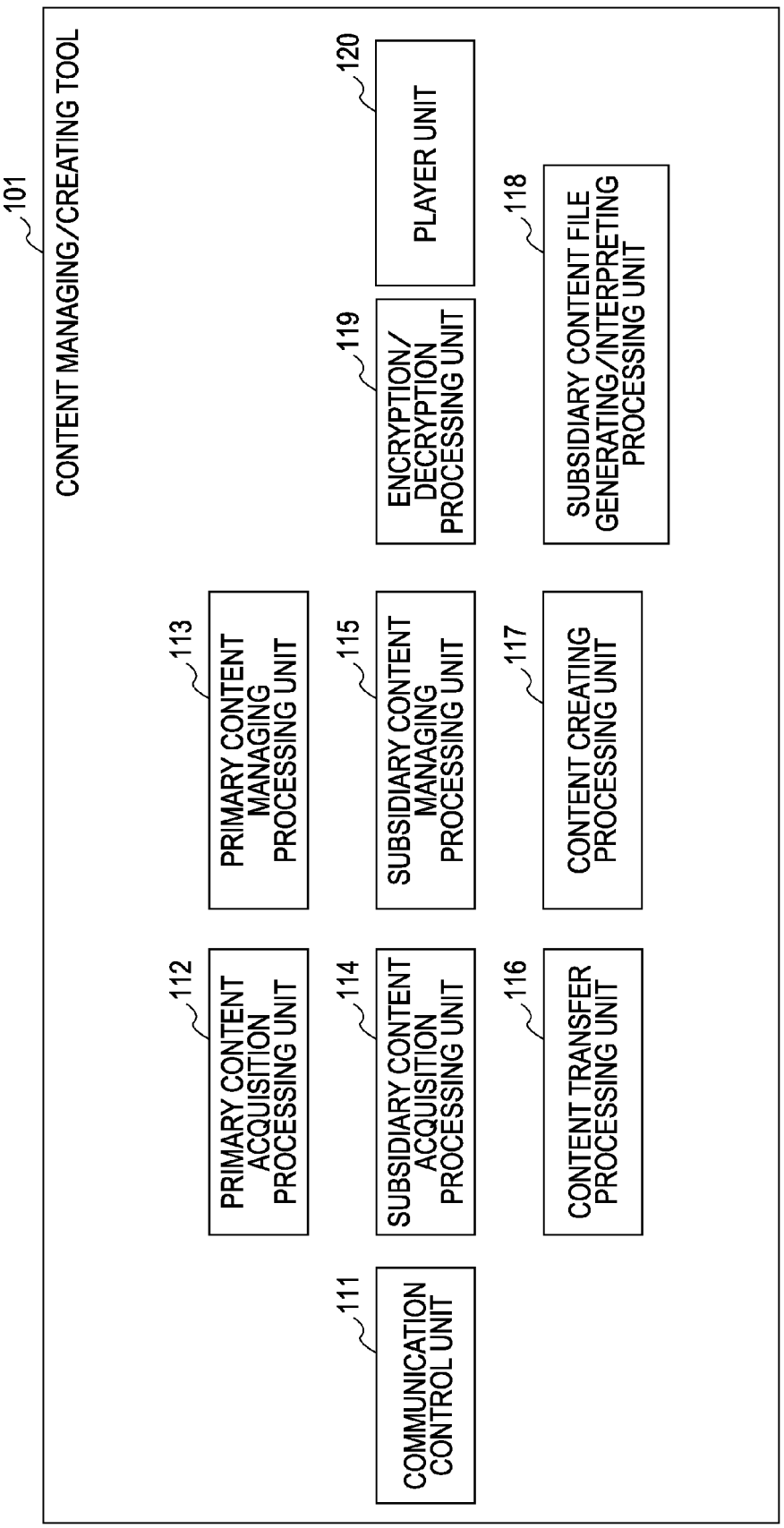
FIG. 12 is a diagram illustrating a program configuration example serving as a content managing/creating tool of a content creating/sharing application.

FIG. 12 is a schematic representation of the program configuration with regard to the content managing/creating tool 101 in increments of function blocks, and can be viewed of being made up of a communication control unit 111, a primary content acquisition processing unit 112, a primary content managing processing unit 113, a subsidiary content acquisition processing unit 114, a subsidiary content managing processing unit 115, a content transfer processing unit 116, a content creating processing unit 117, a subsidiary content file generating/interpreting processing unit 118, an encryption/decryption processing unit 119, and a player unit 120, as shown in the drawing.

The communication control unit 111 is a member made up primarily of programs for executing communication between the primary content server 1 and subsidiary content server 3 primarily with relation to content management/editing via the network.

The primary content acquisition processing unit 112 is a member made up of programs for downloading and acquiring primary contents. The primary content acquisition processing unit 112 provides a user interface for downloading primary contents. Also, control for issuing commands as download requests and causing transmission by the communication control unit 111, processing for receiving handover of packets of the primary content data received at the communication control unit 111 and restoring to the data format as primary contents and so forth, are also executed by this primary content acquisition processing unit 112.

The primary content managing processing unit 113 is a member for executing processing for saving the primary content files acquired by the primary content acquisition processing unit 112 in the HDD 48, and processing for managing the saved primary content files. For example, the primary content managing processing unit 113 also realizes content management such as sorting in accordance with artist name, album units, genre, and so forth.

The subsidiary content acquisition processing unit 114 is a member made up of programs for downloading and acquiring subsidiary contents.

The subsidiary content managing processing unit 115 is a member for executing processing for saving subsidiary content files acquired by the subsidiary content acquisition processing unit 114 in the HDD 48, and processing for managing the saved subsidiary content files.

The content transfer processing unit 116 executes control and processing such that data transfer of content files is executed properly via the communication control unit 111, such as for uploading subsidiary content files to the subsidiary content server 2, for example.

The content creating processing unit 117 is a member for executing processing relating to editing using the editing material contents shown in FIG. 3, i.e., creating the content of contents serving as subsidiary contents, in response to editing operations and the like performed by the user. Accordingly, a user interface for editing operations and so forth is also realized by this content creating processing unit 117.

The subsidiary content file generating/interpreting processing unit 118 first executes processing for generating the data of subsidiary content files in which the tune contents serving as subsidiary contents created by the content creating processing unit 117 are reflected. Also, in the event of playing subsidiary contents, interpretation processing is executed regarding the playback control information in the subsidiary content file shown in FIG. 4, and a playback processing sequence is determined.

With the present embodiment, primary content files are encrypted and transmitted from the primary content server 1. Also, encryption may be implemented at the time of transmitting subsidiary content files from the subsidiary content server 2 to a user terminal device 4 for downloading, and there are cases of transmitting with encryption in the case of uploading subsidiary content data from a user terminal device 4 to the subsidiary content server 2. The encryption/decryption processing unit 119 executes processing for decrypting encryption in the event that a primary content file or a subsidiary content file that has been encrypted is used for operations for playing, editing, or the like. Also, processing for executing encryption is executed to perform encryption on the subsidiary content file and transmit, if this is the case.

The player unit 120 is a member for executing, in the signal processing process for playing primary content files and subsidiary content files as images, audio, and the like, predetermined signal processing which should be carried out at the digital signal format stage. For example, a primary content file has, as the actual entity of data, actual content data which is video data or audio data or the like of a predetermined format, for reproducing the content of the contents. Accordingly, in the event of the player unit 120 playing a primary content file, the player unit 120 executes digital signal processing for playing the video data or audio data or the like which is the actual content data. In the event that this primary content file has been subjected to compression encoding, decoding processing corresponding to this compression encoding is performed, and playback signal processing is performed regarding the digital video signals or digital audio signals.

Also, in the event of playing subsidiary contents, this executes playing processing serving as a sequencer, wherein the data portions of the used primary content files serving as source editing material contents are sequentially played following the sequence of playing processing determined by the aforementioned subsidiary content file generating/interpreting processing unit 118.

Now, at the time of playing subsidiary contents, the results of interpretation of the playback control information by the subsidiary content file generating/interpreting processing unit 118 can be reflected in an editing work screen which is a GUI provided by the content creating processing unit 117. That is to say, the contents of playback instructions indicated by the playback control information can be displayed in a form which the user can recognized, on the editing work screen. The user can confirm in detail how that subsidiary contents was created, by viewing this. This means that how the creator created the subsidiary content can be obtained as accurate information. For example, in the case of general contents, in order for a general user to tell how the content has been created, only estimation can be made from the visual content or the acoustic content which can be actually played and viewed or listened to, or the like. In comparison with this, in the case of the present embodiment, how the subsidiary content has been created can be comprehended in further detail and more specifically. Sharing such subsidiary content among users can be expected to markedly improve the knowledge and skill of users using the content creating/sharing system according to the present embodiment with regard to content creating. The system according to the present embodiment has extremely high entertainment nature and usage value for users with interest in content creating.

Figure 13A:
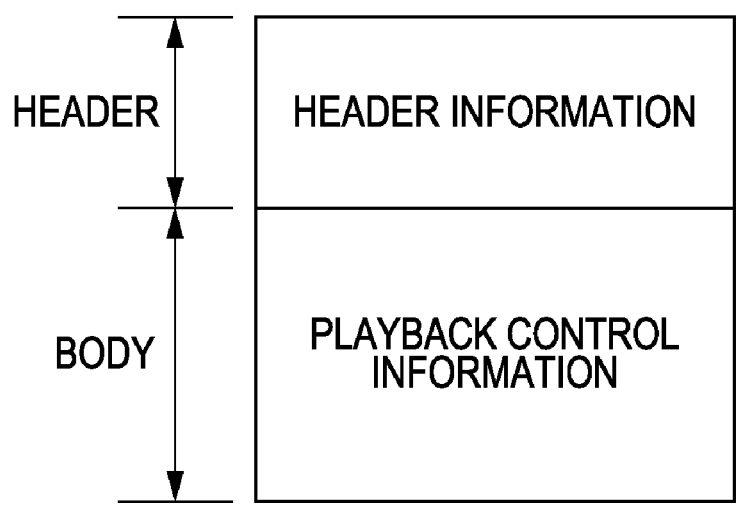
FIGS. 13A and 13B are diagrams schematically illustrating a structural example of a subsidiary content file and a primary content file.

Next, a structural example of content files (primary content package files, subsidiary content files) corresponding to the present embodiment will be described with reference to FIGS. 13A through 15. First, FIG. 13A illustrates a configuration example of a subsidiary content file. As shown in FIG. 13A, the subsidiary content file is configured of a header and body (main portion). The header stores header information made up of a group of predetermined information items (metadata, added information) relating to the subsidiary content file. Accordingly, in the case of a subsidiary content file, playback control information is stored.

Figure 13B:
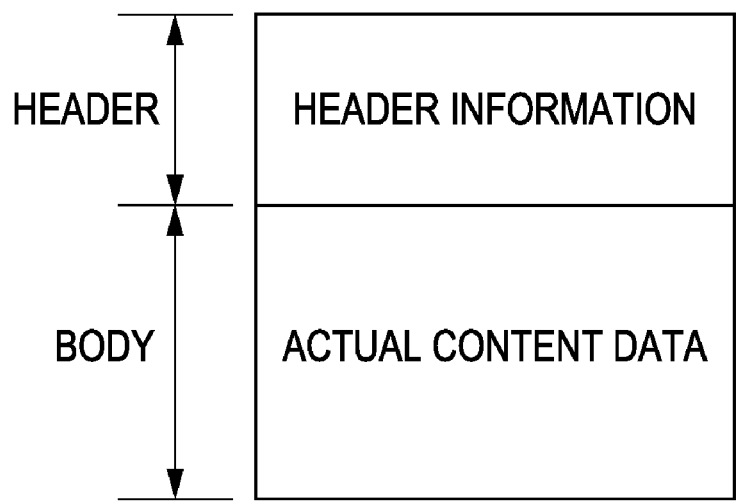

FIG. 13B illustrates a configuration example of a primary content file. The primary content file is also configured of a header and body (main portion), with the header storing header information made up of a group of predetermined information items (metadata) corresponding to the primary content file. The body stores actual content data of a predetermined format as the actual data corresponding to the content of the contents.

With the present embodiment, we will say that there is a sample content file corresponding to each primary content file. The sample content file also has the same structure as the primary content file shown in FIG. 13B. That is to say, header information made up of a group of predetermined metadata corresponding to sample contents, and actual content data for reproducing the content of the sample content (sample material), are stored.

Figure 14:
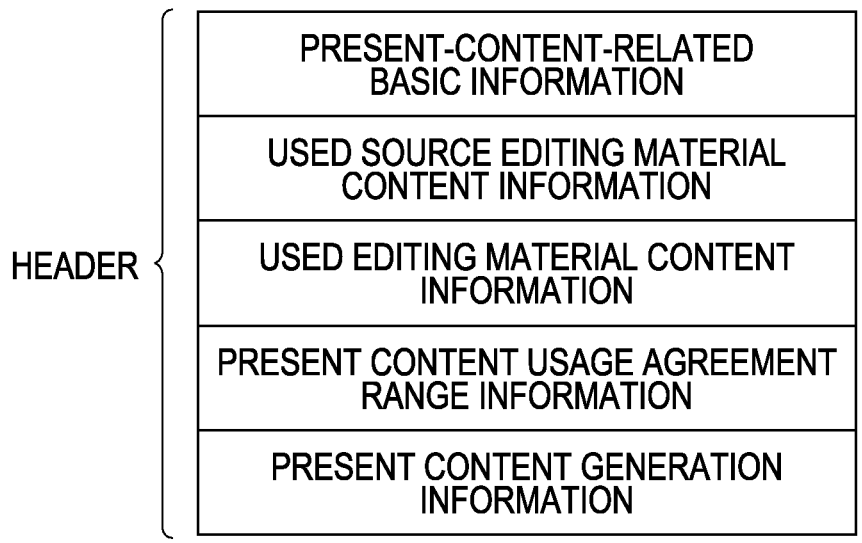
FIG. 14 is a diagram illustrating examples of information items forming header information of a content file.

Now, FIG. 14 shows an example of the content of header information which the header of the subsidiary content file stores. In FIG. 14, the information items (metadata items) making up the header information are present-content-related basic information, used source editing material content information, used editing material content information, present content usage agreement range information, and present content generation information.

Figure 15:
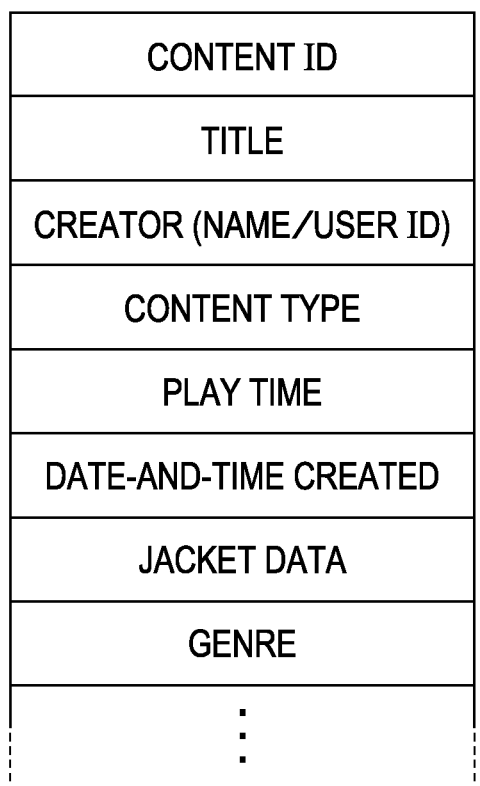
FIG. 15 is a diagram illustrating an example of information items forming present content related basic information, which is one of information items forming the header information.

The present-content-related basic information is basic information items (metadata) relating to the present content file. FIG. 15 illustrates and example of an information item (metadata item) group making up the present-content-related basic information, with content ID, creator (name/user ID), content type, play time, date-and-time created, jacket data, genre, and so on, being shown.

The content ID here is an identifier uniquely given to each subsidiary content. Note that with the present embodiment these content IDs are given to each content file by the content database management unit 26 of the subsidiary content server 2, for example.

The title is information indicating the title given to the subsidiary content file.

The creator is information indicating the creator of the subsidiary content file (also can be called "writer", "producer", "artist", or the like). Here, a name corresponding to the creator, and a user ID of the creator, are stored.

The content type is information indicating type, range, etc., of the content of the contents which the subsidiary content file has, such as movies, tunes, photographs (still images), and so forth.

Play time is information indicating the total play time of the content serving as the subsidiary content file.

Date-and-time created is information indicating the date and time at which the subsidiary content file was created.

There are cases wherein a content is provided with image data, such as a jacket of an album. Jacket data is such image data.

The genre is information indicating what the genre given to the content of the contents serving as the subsidiary content file.

Of course, information items other than those listed here may be included in the present-content-related basic information as well.

Used source editing material content information is information indicating what the source editing material content (which is the used source editing material content) to be used for playing the content of the contents serving as the subsidiary content file is. In other words, this is information indicating which primary content like or subsidiary content file has had the actual content data thereof used for creating the subsidiary content.

In correlation with FIGS. 5A though 5C, the primary content file shown as making up the subsidiary content newly created by editing processing is the above-described used source editing material content information. Accordingly, in the case of FIG. 5A, the primary contents A and B are shown in the usage primary contents information, in the case of FIG. 5B, the primary contents A, B, and C are shown, and in the case of FIG. 5C, the primary contents C, D, E, and F are shown.

Also, there may be a possibility that a certain primary content included in the editing material content may not be used at all in the content of the contents serving as the subsidiary content created by editing the editing material content. With the example of the case in FIG. 5B, with the new subsidiary content obtained by performing editing using the editing material contents A and B for example, there may be a possibility that the contents will be that which uses at least a part of the primary contents A and C, but not using the primary content D at all. In this case, only the primary content A and C are actual content data of primary contents used for playing the subsidiary content, and the primary content D is unused.

With regard to how the contents of the used source editing material content information should be corresponding to such a case, there can be conceived one arrangement wherein the contents are such that only the primary contents A and C are shown and the primary content D is not shown, based on the idea that only primary contents actually used for playing the subsidiary content should be reflected.

As for another, there can be conceived another arrangement wherein the contents are such that all of the primary contents A, C, and D are shown. That is to say, this is based on an idea wherein, in this case, while the primary content D is not actually used, there has been the influence of the content of the contents serving as the primary content D to a certain extent in the process of creating the subsidiary content, and accordingly is equivalent to being used in an underlying manner. In this case, all primary contents which have been used even once up to the generation of the subsidiary content created this time are consequently included in the used source editing material.

As described later with reference to FIG. 16, the used source editing material content information also includes metadata of predetermined content, relating to the primary contents shown here.

Also, the used editing material content information is information indicating which editing material contents (used editing material contents, directly-used contents) have been directly used for creating the subsidiary content file. With the example in FIGS. 5A through 5C, stored in the used editing material content information of the new subsidiary content shown in FIG. 5A is data indicating the actual primary content files serving as the editing material contents A and B. Also, in the case of the new subsidiary content shown in FIG. 5B, data indicating the primary content file serving as the editing material content A, and the subsidiary content file serving as the editing material content C, is stored. Also, in the case of the new subsidiary content shown in FIG. 5C, data indicating the subsidiary content files which are the serving as the editing material content C and D is stored as used editing material information.

Note that, as shown in FIG. 16 which will be described later, the used editing material content information also has attached information of related predetermined contents for each of the editing material contents shown here.

The present content usage agreement range information is information of a usage agreement range set regarding the present content file. The structure should comply with the usage agreement range information of the configuration example described later with FIG. 16.

The present content generation information is information indicating what generation the present subsidiary content is, as a content created under the environment of the content creating/sharing system according to the present embodiment.

FIG. 16 illustrates structural examples of the used source editing material content information and used editing material content information. Note that here, the used source editing material content information and used editing material content information are shown as having a common basic structure. Accordingly, the content of FIG. 16 is shown with both the used source editing material content information and used editing material content information being shown in common. As shown in FIG. 16, the used source editing material content information/used editing material content information primarily are made up of linked unit file information. Each unit file information corresponds to one used source editing material content information or used editing material content information. Note that in order to simplify description, both used source editing material content information and used editing material content information will be referred to simply as "used content" if there is no particular distinction therebetween.

For unit file information, for example, the items of content ID, creator, title, generation, and usage agreement range information are provided.

Here, content ID stores the content ID provided to the content file of the corresponding used content.

Creator stores the name of the writer of the corresponding used content, and the user ID of the creator.

Title indicates the tile of the corresponding used content as the name thereof.

The generation information item stores generation information. The generation information is information indicating what generation content the content is. With the content creating/sharing system according to the present embodiment, primary contents are defined explicitly as first-generation contents, while subsidiary contents are defined as being an N'th generation according to predetermined rules, corresponding to the generation of the editing material contents. Accordingly, in the event that the used content information shown in FIG. 16 is used source editing material content information, information indicating first generation will be stored in the time of generation information. Also, in the event that the used content information shown in FIG. 16 is editing material content information, information indicating the generation which is actually set in accordance with each used content (primary content or subsidiary content) corresponding to the unit file information is stored.

The information of the usage agreement range (usage agreement range information) is formed of a group of one or more usage items 1 through n.

The usage items 1 through n are assigned such that predetermined usage contents related to editing (secondary use) of corresponding usage contents correspond to each. Examples of usage contents to be appropriated to usage items which can be conceived include the following.

Contents relating to whether or not secondary usage of the present content is permitted Contents relating to using contents of another creator from the present contents, with regard to other contents to be used as editing material Contents relating to using contents of another album from that to which present contents belong, with regard to other contents to be used as editing material Contents relating to using particular effects and special effects Contents relating to using particular plug-in modules Extracting a part from the entire content and using as editing material Permission contents relating to the extracted actual content data portion in the event of extracting a part from the entire content and using as editing material Number of usable generations (for example, in the event of permitting use for two generations, i.e., up to the grandchild generation (third generation), as primary content, child subsidiary content using this primary content and current grandchild subsidiary content using the subsidiary content can be created, but editing of the grandchild subsidiary content is not permitted with regard to the portion using the corresponding primary contents)

Contents relating to number and type of contents regarding which secondary use can be performed in combination with the present content Information indicating contents relating to usage authorization set for each usage item, beginning with permitted/not-permitted for example, is described for each of the these usage items. As for the information of the usage agreement range, generalizing the usage setting contents described for each of these usage items indicates the usage agreement range for the corresponding usage content.

With regard to the content of the header information of the primary content file, particular description by way of reference to the drawings will be omitted, and it should be noted that it is sufficient to have information defining the primary content file as being used. However, with the present embodiment, an arrangement wherein the header information of the primary content files have a common structure with those of the subsidiary content files can be considered to be appropriate. With such a primary content file header information structure, the header structure is standardized between primary contents and subsidiary contents, and which can be expected to lead to improved efficiency in content file management with the content creating/sharing system according to the present embodiment. One example thereof is that the primary content files will have present content usage agreement range information, so a usage agreement range which more accurately reflects the decisions and ideas of the writers can be set of the primary contents which are first-generation contents.

It should be noted though, that primary content package files are not created secondarily using other contents. Accordingly, no meaningful information has to be stored regarding the used source editing material content information and used editing material content information shown in FIG. 16, in the header of the primary content files, for example.

Next, playback control information in subsidiary content files will be described. Playback control information is unit information made up describing a processing sequence for playing the content of contents serving as current subsidiary content, in a predetermined language, unlike actual content data. Elements of the description contents forming this playback control information include, for example, first, a description indicating primary content serving as actual content data used for playback, description indicating a data portion to be used for actual playing subsidiary content from the actual content data serving as this primary content, and description indicating the time for playing this data portion. Also, description for applying effects or special effects, such as fade-in, fade-out, overlap, equalizing (tone adjustment), playback speed rate, reverberation, delay, and so forth, for example, is performed.

FIG. 17 illustrates an example of the content of playback control information. In this drawing, the description portions between the brackets [ ] indicate the playback control content for one primary usage content (source editing material content).

An example of playback control content of a usage primary content unit shown in FIG. 17 will be described. First, as for the playback control content as unit of used content shown at the head in the drawing, [file_id=AAAAAA; time=00:00-00:10; position=vv-zz] is described. This specifies that the used content is specified by the content ID=AAAAAA (the descriptor of file_id here), and that the play time of the current subsidiary content using this usage content is 00:00 (start time)-00:10 (play time 10 seconds), and that the data section (section of actual content data) of the usage content used during this play time is a range corresponding to address vv through address zz.

For the playback control content of the subsequent used content unit, [file_id=AAAAAA; time=00:10-00:15; position=ss-tt] is described. This specifies that the usage content is specified by the content ID=AAAAAA, and that the play time of the current subsidiary content using this usage content is 00:10-00:15, and that the data section of the usage content used during this play time is a range corresponding to address ss through address tt.

For the playback control content of the subsequent used content unit, [file_id=BBBBBB; time=00:15-00:20; position=pp-uu] is described. This specifies that the usage content is specified by the content ID=BBBBBB, and that the play time of the current subsidiary content using this usage content is 00:15-00:20, and that the data section of the usage content used during this play time is a range corresponding to address pp through address uu.

For example, at the time of playing the subsidiary content file, the player unit 120 of the content creating/sharing application 100 according to the present embodiment thus sequentially interprets the playback control contents of the usage content units in the brackets [ ], and executes actual playback control in accordance with the interpretation results, thereby playing and outputting the subsidiary content as video signals, audio signals, and so forth.

Figure 18:
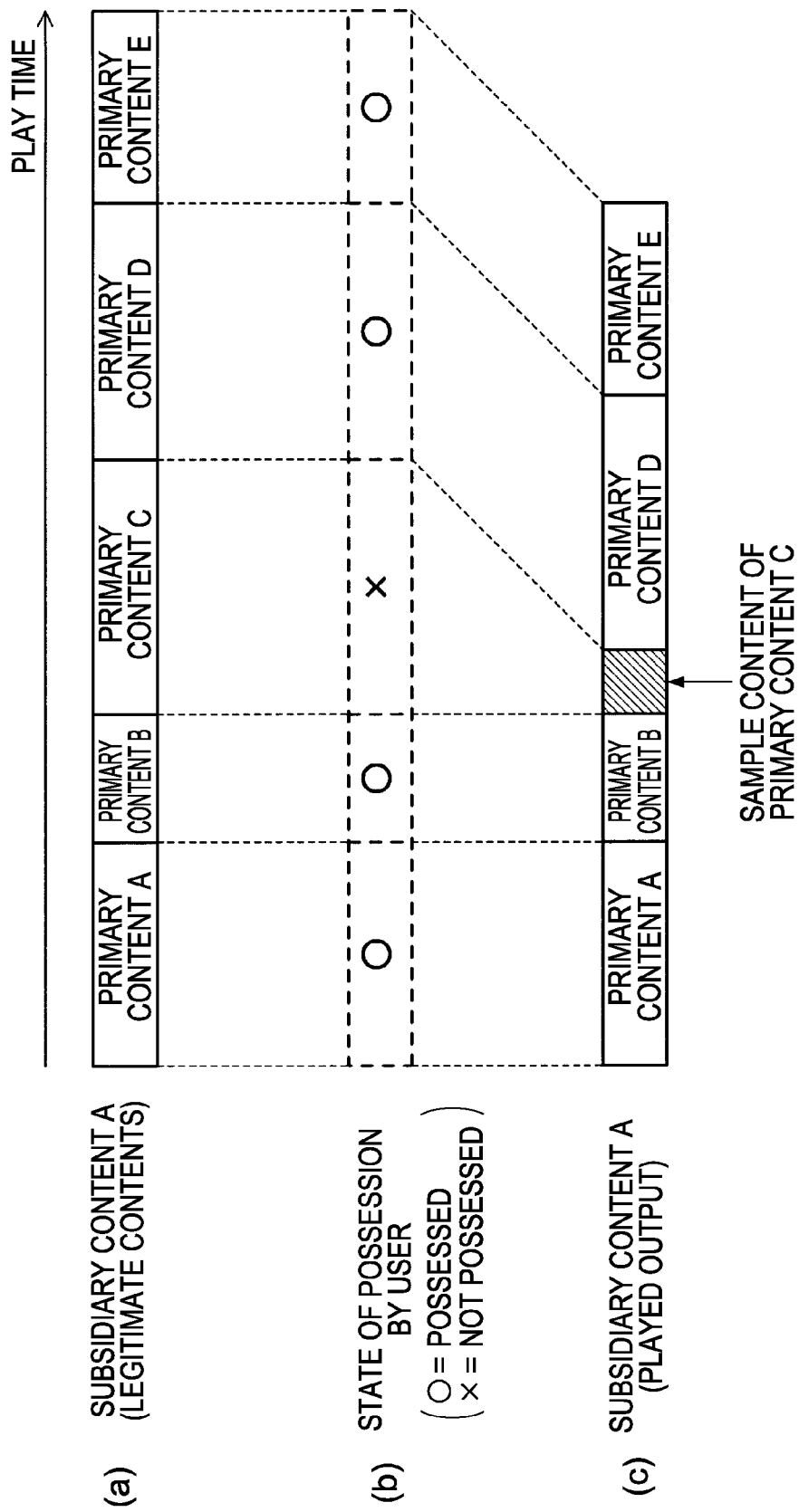
FIG. 18 is a diagram schematically illustrating an example of one form of sample-using subsidiary content playback according to the embodiment.

Now, playback of subsidiary contents using the sample contents according to the present embodiment will be described. FIG. 18 illustrates an example of a form of subsidiary content playback using sample contents (hereafter also referred to as "sample-using subsidiary content playback") according to the present embodiment. An example of a playback form of sample-using subsidiary content playback will be described, along with the necessity thereof.

In FIG. 18, (a) illustrates original complete playback contents (legitimate content) in accordance with the play time of one subsidiary content A, by breakdown of by source editing contents. The subsidiary content A in this case has been edited such that at least a part of the play time portion of the contents of a primary content A, primary content B, primary content C, primary content D, and primary content E, are sequentially played from the beginning following the play time, as shown in FIG. 18.

Note that multiple source editing material contents may be multiplexed (mixed) over the same time, as one technique for editing performed in creating subsidiary contents. However, here, a case of forming the subsidiary content A by the above-described editing will be described to facilitate description regarding sample-using subsidiary content playback. In this description, we will say that the user of a user terminal device 4 has the subsidiary content A.

Note that a content being "held" or "possessed" by a user as used here refers to, firstly, a state wherein a primary content file is stored and managed in a state where it can be viewed as being local as to the content creating/sharing application 100 (user terminal device 4) of the user, for example. Also, this implies a state wherein, even if not locally existing, but existing on a server or the like, the primary content file can be accessed and played by the content creating/sharing application 100 by streaming or the like, for example, in which a state the user can be viewed as "holding" the content file. Examples of such primary contents include those which can be streamed or downloaded from a server under a content viewing/listening contract such as a subscription, and locally saved. This can also be said to be contents which the user does not have to pay for separately at the time of starting playing, but rather which the user has the right to play.

As can be understood from the description so far, in order to play the subsidiary content A as with the content of the legitimate content, the user has to have all of the source editing material contents in the subsidiary content A. that is to say, all of the source editing material contents corresponding to the subsidiary content A have to be included in the primary contents held by the user (held primary contents).

In this case, we will say that the user has, of the primary content A, primary content B, primary content C, primary content D, and primary content E, which are the source editing material contents of the subsidiary content A, the primary contents A, B, D, E, but does not have the primary content C.

Now, if the user has all of the primary contents A through E and plays the subsidiary content A with the content creating/sharing application 100 (player unit 120), the subsidiary content A will be played in the order of primary content A→primary content B→subsidiary content C→subsidiary content D→subsidiary content E, in which case, the user can view/listen to the content of the legitimate content.

On the other hand, in the event that the user attempts to play the subsidiary content A in a state of not holding the primary content C as shown in (b) in FIG. 18, i.e., in the event that there is a lacking primary content in the primary contents (source editing material contents) for playing the subsidiary content A, the output results are as follows, for example.

For example, in the case of playing in the order of primary contents A and B in (a) in FIG. 18, and the section of the next primary content C is reached, the content of the primary content C is not output. One example would be a case in which the primary content C is an audio content, in which a silent state would continue through the second corresponding to the primary content C in (a) in FIG. 18. Another example would be a case wherein the primary content C is a video content such as moving images or the like, in which no image is output during the section corresponding to the primary content C, or the final image of the preceding primary content B is continuously output as a still image. Upon the section during which no content output is made, playback resumes during which the primary contents D and E are output in that order.

In this way, in the event that there is a primary content serving as a source editing material content which the subsidiary content being played uses which is not held, i.e., a lacking primary content, the portion of the lacking primary content drops out and is not played.

That is to say, even if the user can view/listen to the subsidiary content, the user has to view/listen to a content with the portion thereof corresponding to the lacking content having dropped out. Such playing where the content is abruptly interrupted may seem unnatural or unpleasant to the user. Also, with such a playing form, the user views/listens to a content quite different from the legitimate content, meaning that the user may have difficulty in imagining the complete content of the subsidiary content A. Such an incomplete experience may prevent the user from wanting to view/listen to the complete content, leading to lost opportunities for the user to purchase the lacing primary content.

In such a case, of course, the user can newly download and hold the primary content C. However, there may be cases where the user downloads the primary content C and then views/listens to the legitimate content of the subsidiary content A this time, only to find that he/she is not fond of it and regrets having gone to the trouble to download the primary content C.

Accordingly, with the present embodiment, in the event that the user does not hold a primary content to be used as source editing material at the time of playing and output of a subsidiary content, a sample material can be played instead of the primary content not held (lacking primary content).

That is to say, at the time of playing the subsidiary content A under the state of holding primary contents indicated by (b) in FIG. 18, first, the primary contents A and B are played in order, and next, the sample content corresponding to the primary content C is played, following which the primary contents D and E are played in order.

Plying sample-using subsidiary content playback in this way first avoids a state in which playing output of contents is interrupted, thereby markedly resolving the issue of unnatural and unpleasant feelings for the user. Also, while not complete, the user can imagine the content of the contents in a form closer to the original, which may lead the a higher chance of the user purchase and hold the lacking primary content so as to view/listen to the complete content of the contents, if the user likes the experience. This can contribute to sales of primary contents.

Figure 19:
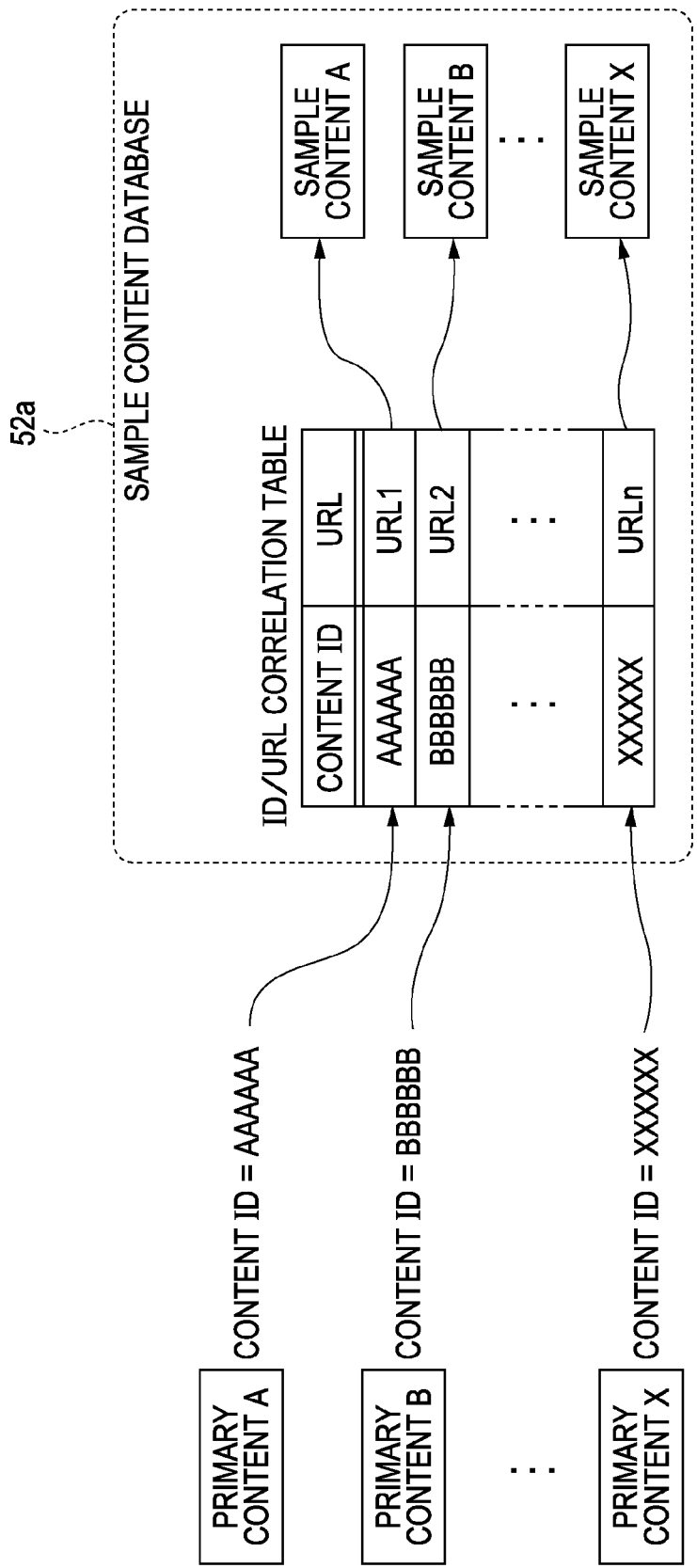
FIG. 19 is a diagram for describing an example of a form of managing sample contents in the sample content server.

Next, a configuration example of realizing the sample-using subsidiary content playback according to the present invention, exemplarily illustrated in FIG. 18, will be described. First, an example of the management form of sample contents in the sample content server 8 will be described. In FIG. 19, an example of a form of management relating to correlation with primary contents is illustrated as sample content management in the sample content database 50*a* in the storage unit 52 of the sample content server 8.

Now, The sample content database 52*a* is configured having an ID/URL correlation table as shown in FIG. 19. The ID/URL correlation table is data in a table format, where the URLs (Uniform Resource Locators) of sample contents stored in the storage unit 52, for each content ID of the primary content held in the primary content server 1.

For example, in the ID/URL correlation table in FIG. 19, the content ID=AAAAAA of the primary content A and a URL1 are correlated. This URL1 is a description of a URL corresponding to a particular address (directory) in the storage unit 52. That is to say, the address (saving location) of the sample content A can be found by referring to the ID/URL correlation table with the content ID of the primary content A as a key. The sample content correlated with the primary content A in this way has the sample material corresponding to the primary content A.

Also, for example, described in the URL2 correlated with the content ID=BBBBBB of the primary content B is the URL of the sample content B having the sample material corresponding to the primary content B. Moreover, the URLs of corresponding sample contents are described for each primary content in the ID/URL table, up to the final primary content X.

Thus, correlation is realized by the ID/URL table between the primary contents held at the primary content server 1, and the corresponding sample contents held at the server content server 8.

Figure 20:
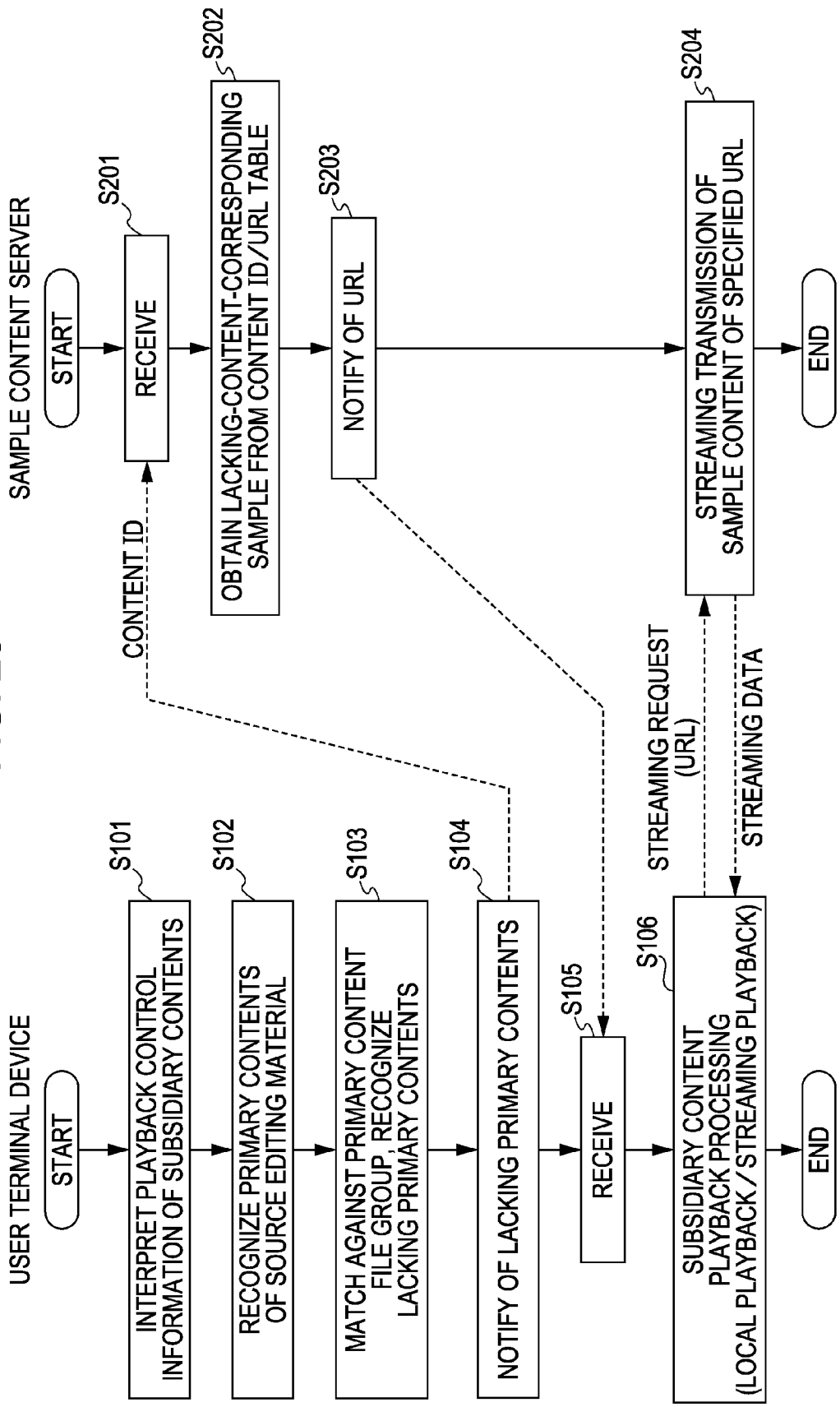
FIG. 20 is a flowchart illustrating an example of processing procedures to be executed by the user terminal device and sample content server for sample-using subsidiary content playback.

The flowchart in FIG. 20 illustrates an processing example executed by the user terminal device 4 (content playing device) and sample content server 8 (server device) for sample-using subsidiary content playback. Note that the processing of the user terminal device 4 in FIG. 20 can be viewed as primarily the player unit 120 of the content managing/creating tool 101 collaborating with other functional units (shown in FIG. 12) as appropriate. That is to say, this can be realized by the user terminal device 4 executing the program which is the content managing/creating tool 101. Also, the processing of the sample content server 8 in FIG. 20 can be viewed as being executed by the computer system of the control unit 51 executing a program.

Now, let us say that the user has performed an operation at the content managing/creating tool 101 running on the user terminal device 4, for example, to select one subsidiary content from the already-held subsidiary contents, and to play that subsidiary content.

In response to this operation, the play unit 120 for example instructs the subsidiary content file generating/interpreting processing unit 118 to read out the subsidiary content regarding which playback has been instructed (subsidiary content to be played) and interpret the playback control information thereof.

As a result of the interpretation processing, what the primary contents serving as the source editing material for the subsidiary content to be played (source editing material contents) are is recognized. The content ID of the source editing material content for example, is recognized at this time.

According to the description earlier in FIG. 16, the content ID of the source editing material content of the directly used content can be recognized by referring to the used source editing material content in the header information. Accordingly, in order to obtain recognition results of the source editing material contents in accordance with step S102, the used source editing material content information may be referred instead of the playback control information analysis. However, in this case, playback processing of subsidiary contents to be played is performed in the later-described step S106, so interpretation of the playback control information is performed in step S101 doubling as preparation thereof.

Here, we will say that the primary content files included in the primary content file group 103 are equivalent to the held contents of the user. Accordingly, the play unit 120 for example collaborates with the subsidiary content managing processing unit 115 for example, and performs matching processing in step S103 regarding whether or not there are primary contents in the primary content files making up the primary content file group 103 stored in the HDD that are the same as the primary contents serving as the source editing material recognized in step S102.

As a result of this matching, the primary contents recognized as being source editing material in step S102 are divided into those held by the user (held source editing material contents) and not held (lacking primary content). That is to say, in step S103, the lacking primary contents of the primary contents ultimately recognized as source editing material in step S102 are recognized.

In the next step S104, the player unit 120 collaborates with the communication control unit 111 for example, to notify the sample content user 8 of the lacking primary contents recognized in step S103.

Upon receiving the notification of lacking primary contents (content ID) transmitted in step S104, in step S201 sample content user 8 advances the flow to step S202 and on.

In step S202, the sample content user 8 makes reference to the content ID/URL table in the sample content database 52a in the storage unit 52. The URLs of sample contents corresponding to the content IDs of the lacking primary contents received in step S201 are then searched and obtained from the content ID/URL table.

Next, in step S203, the sample content server 8 makes notification of the URLs obtained in step S202. At this time, the sample content server 8 transmits the URLs to the user terminal device 4 in a format where correlated with the content IDs of the lacking primary contents.

At the user terminal device 4, the information of the URLs transmitted as notification in step S203 is received in step S105. At this time, at the application layer for example, the communication control unit 111 of the content managing/creating tool 101 receives, and hands to the player unit 120, for example.

The player unit 120 executes playing processing as described next for example, using the interpretation results of the playback control information regarding the subsidiary content to be played in step S101 and the URLs of lacking contents obtained in step S105.

First, a request for streaming of the lacking primary contents of the primary contents identified as source editing material by the interpretation processing in step S101 is made to the sample content server 8 at a predetermined timing before the playback start timing in the playback sequence, for example. This streaming request is a request for transmission of the data of the sample contents by streaming, and a the time of requesting, the sample contents to be streamed are specified by the URL thereof. It should be noted that the URLs are obtained in step S105.

The sample content server which has received the streaming request reads out the sample content data in the directory indicated by the URLs received with the request thereof, as shown in step S204, and transmits to the requesting user terminal device 4 (player unit 120) by streaming. Note that the processing in step S204 can be viewed as being executed by the sample content server 8 each time a streaming request is received.

Such an exchange between the user terminal device 4 and the sample content server 8 enables sample content data to be received at the user terminal device 4 (player 120) as streaming data, as one processing in step S106. Note that the data of the sample contents is actual content data serving as the sample contents, and accordingly, is video data, audio data, etc., whereby the content of the contents serving as sample contents can be reproduced.

At the player unit 120, at the point that a timing has arrived at which to start playing of the primary content contents which the user holds when performing sequence playing of the primary contents serving as source editing contents in accordance with eth results of interpretation performed in step S101, the primary contents are read out from the local saving location for example, and playing signal processing thereof is started.

Here, playback signal processing of primary content files saved locally will be referred to as "local playback".

On the other hand, at the point that a timing has arrived at which to start playing of the lacking primary contents, playback signal processing of content data locally existing in a streaming format due to the above-described streaming request is started. This streaming data playback will be referred to as "streaming playback" here.

Figure 21:
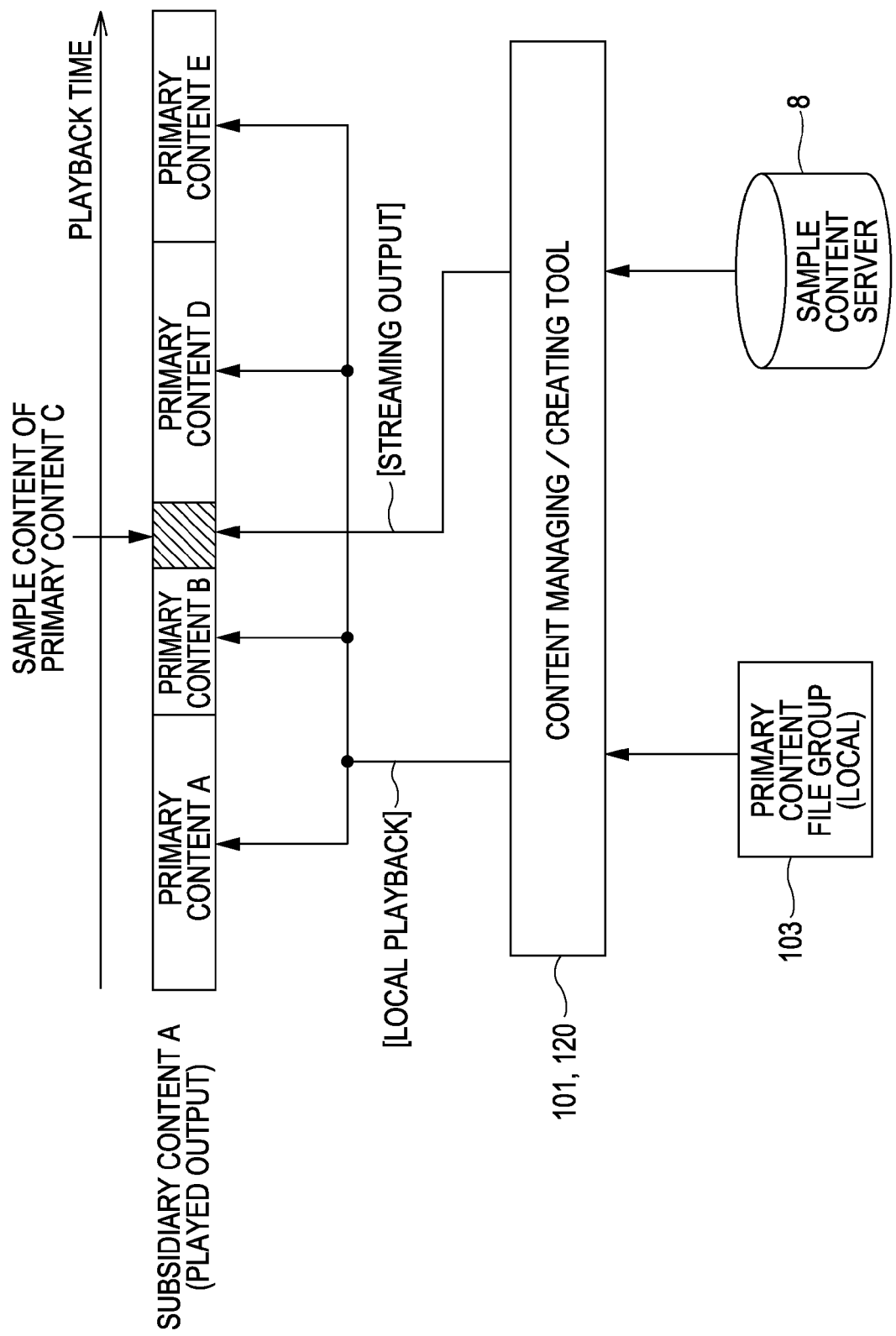
FIG. 21 is a diagram illustrating processing executed by the user terminal device for sample-using subsidiary content playback, corresponding with the case shown in FIG. 19.

FIG. 21 schematically illustrates an example of playback processing realized by step S106, with the example of the subsidiary content A shown in FIG. 19. In this case, the user holds, of the primary contents A through E which are source editing material contents of the subsidiary content A, the primary contents A, B, D, and E, and the primary content alone is a lacking primary content. In this case, we will say that the contents held by the user are included in the primary content group 103.

As playback processing of the subsidiary content A based on the interpretation results of the playback control information (following playback control information), first, the player unit 120 of the content managing/creating tool 101 reads out the data of the content file of the primary content A to be played first in the subsidiary content, and executes playback processing by local playback. Upon the playback processing of the primary content A ending, next, the local playback of the primary content B is performed.

At the point of local playback of the primary content B ending, next, playback processing of the sample data of the primary content C received by the steaming request is started. That is to say, for the playback section (part) of the lacking primary content, playback signal processing is executed for the data of the sample content received as streaming data, during playback of the subsidiary content. The playback timing of the sample content in the flow of playing the subsidiary content A, and other playback control, can be based on the description of the corresponding primary contents (source editing material contents) in the playback control information.

Also, in actual practice, there is no guarantee that streaming data can be received at the start timing of the playback section of the lacking primary content. Accordingly, a streaming request is made at a timing earlier than the playback start time of the lacking primary content, thereby allowing the streaming data to be received at a timing earlier than the playback start time of the lacking primary content. The playback signal processing of buffered streaming data is started such that the playback is output at a timing corresponding to the playback start time of the lacking primary content.

Next, upon the streaming playback of the sample content corresponding to the primary content C as described above ending, the primary contents D and E are locally played following the interpretation results of the playback control information. Performing such processing in the actual step S106 realizes the sample-using subsidiary content playback regarding the subsidiary content A.

Note that the configuration for realizing the sample-using subsidiary content playback according to the present embodiment is not restricted to the configuration shown in FIGS. 19 and 20. As one example, in FIG. 19, the URLs of the sample contents are correlated with the content IDs of the primary contents in the ID/URL table, so as to correlate the primary contents and sample contents, but the sample-using subsidiary content playback according to the present embodiment can be realized by correlating the content IDs of sample contents instead of the URLS of the sample contents, with the content IDs of the primary contents.

Also, as for an arrangement for the user terminal device 4 (content managing/creating tool 101) side to recognize URLs of lacking primary contents, an arrangement may be made wherein a URL or content ID of a sample content corresponding to each primary content serving as source editing material is stored beforehand as metadata of the subsidiary content (e.g., can be stored in header information). In this case, the user terminal device 4 (content managing/creating tool 101) can recognize the URL of the lacking primary content by referring to the metadata of the subsidiary content to be played. Accordingly, the ID/URL table shown in FIG. 19 does not have to be used with this arrangement. Further, processing for notification of lacking contents and notification of URL between the user terminal device 4 and the sample content server 8 in steps S104, S105, and S201 through S203 in FIG. 20, does not have to be performed.

Though touched upon earlier, the sample-using subsidiary content playback according to the present embodiment is applied to portions wherein multiple source editing material contents are mixed, synthesized, and played in the same playback time in the subsidiary content, as well. This is no different from the description made above regarding step S106, that in the event that there is a lacking primary content, sample content data is played instead of the actual content data of the lacking primary content.

Also, sample contents have been described as being transmitted by streaming with the description regarding FIGS. 20 and 21, since we are assuming that with an actual content creating/sharing system, the data of sample contents would not be stored locally. Accordingly, in the event that the data of sample contents is permitted to be downloaded and locally saved, the data of the sample content can be downloaded from the sample content server and saved locally at the user terminal device 4. The configuration regarding the subsequent subsidiary content playback would be such that the sample contents are also locally played and output. In this case, the streaming server can be omitted from the sample content server 8, for example.

Also, the configuration of the primary content server 1, subsidiary content server 2, communication server 3, sample content server 8, and user terminal device 4 are but one example, and may actually be changed as appropriate. Also, a configuration may be made wherein at least one of the above servers is dispersed among multiple server, or conversely, where at least two or more of these servers are integrated.

The elements of the invention according to the embodiment of the present invention may be included in the subsidiary content server 2 in correspondence with the present embodiment, but other arrangements may be made wherein components corresponding to the elements of the invention are dispersed in other servers as appropriate, and the configuration of an information processing device according to the present invention is realized by cooperation with these servers.

Also, while no specific example of a GUI screen or the like has been shown for the content creating/sharing application 100 has been described so forth, various GUI configurations can be conceived for the content creating/sharing application 100.

Also, the functional configuration of the content creating/sharing application 100 also is not restricted to that described with reference to FIGS. 11 and 12, and so forth, and various configurations can be conceived.

Also, the structure of the subsidiary content files shown in FIGS. 13A through 17 is only an example, and a conceptual one at that, so various modifications and developments therefrom may be made based thereupon.

Also, the programs executed by the primary content server 1, subsidiary content server 2, communication server 3, sample content server 8, and user terminal device 4, may be written to and stored in a storage region such as an internal HDD, storage unit, or the like, as described above, or may be stored in a removable storage medium and installed (including updates) from the storage medium to the storage region. Also, an arrangement may be conceived wherein programs can be installed under the control of other host devices via a predetermined data interface. Further, an arrangement may be conceived wherein programs are stored on a storage device on the network, and can be downloaded and obtained from the storage device by the servers and the user terminal device 4.

The present application contains subject matter related to that disclosed in Japanese Priority Patent Application JP 2008-146011 filed in the Japan Patent Office on Jun. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content playing device comprising:
identifying means configured to identify,
with regard to subsidiary contents created by editing processing secondarily using at least one content as editing material and having, as information for reproducing content of the subsidiary contents, playback control information formed of content instructing playback of actual content data of source editing material contents which are primary contents serving as source editing material,
lacking primary contents, which are said source editing material contents that are not included in held primary contents deemed to be held by a user;
sample content obtaining means configured to externally obtain sample contents corresponding to said lacking primary contents; and
playback processing means configured to execute, at a time of playing said subsidiary contents following said playback control information,
playback signal processing for actual content data of held source editing material contents currently existing as said held primary contents, for held source editing material contents which are said source editing material contents included in said held primary contents, and
playback signal processing for actual content data of the sample contents regarding said lacking primary contents.

2. A content playing system comprising:
a content playing device; and
a server device;
said content playing device further including
identifying means configured to identify,
with regard to subsidiary contents created by editing processing secondarily using at least one content as editing material and having, as information for reproducing content of the subsidiary contents, playback control information formed of content instructing playback of actual content data of source editing material contents which are primary contents serving as source editing material,
lacking primary contents, which are said source editing material contents that are not included in held primary contents deemed to be held by a user;
sample content obtaining means configured to externally obtain, from said server device, sample contents corresponding to said lacking primary contents by communication via a communication network, and
playback processing means configured to execute, at a time of playing said subsidiary contents following said playback control information,
playback signal processing for actual content data of held source editing material contents which are said held primary contents, for the held source editing material contents which are said source editing material contents included in said held primary contents, and
playback signal processing for actual content data of the sample contents regarding said lacking primary contents;
and said server device further including
storage means configured to store said sample contents; and
transmission means configured to transmit to said content playing device said sample contents which said sample content obtaining means are to obtain, from said sample contents stored in said storage means, by communication via a communication network.

3. A content playing method comprising the steps of:
identifying,
with regard to subsidiary content created by editing processing secondarily using at least one content as editing material and having, as information for reproducing content of the subsidiary contents, playback control information formed of content instructing playback of actual content data of source editing material contents which are primary contents serving as source editing material,
lacking primary contents, which are said source editing material contents that are not included in held primary contents deemed to be held by a user;
externally obtaining sample contents corresponding to said lacking primary contents; and
executing, at a time of playing said subsidiary contents following said playback control information,
playback signal processing for actual content data of held source editing material contents which are said held primary contents, for the held source editing material contents which are said source editing material contents included in said held primary contents, and
playback signal processing for actual content data of the sample contents regarding said lacking primary contents.

4. A storage device on which is stored a program which, when implemented by a processor, causes a content playing device to execute steps of:
identifying,
with regard to subsidiary content created by editing processing secondarily using at least one content as editing material and having, as information for reproducing content of the subsidiary contents, playback control information formed of content instructing playback of actual content data of source editing material contents which are primary contents serving as source editing material, lacking primary contents, which are said source editing material contents that are not included in held primary contents deemed to be held by a user;

externally obtaining sample contents corresponding to said lacking primary contents; and executing, at a time of playing said subsidiary contents following said playback control information, playback signal processing for actual content data of held source editing material contents which are said held primary contents, for the held source editing material contents which are said source editing material contents included in said held primary contents, and playback signal processing for actual content data of the sample contents regarding said lacking primary contents.

5. A content playing device comprising:

an identifying unit configured to identify, with regard to subsidiary contents created by editing processing secondarily using at least one content as editing material and having, as information for reproducing content of the subsidiary contents, playback control information formed of content instructing playback of actual content data of source editing material contents which are primary contents serving as source editing material, lacking primary contents, which are said source editing material contents that are not included in held primary contents deemed to be held by a user;

a sample content obtaining unit configured to externally obtain sample contents corresponding to said lacking primary contents; and a playback processing unit configured to execute, at a time of playing said subsidiary contents following said playback control information, playback signal processing for actual content data of held source editing material contents currently existing as said held primary contents, for the held source editing material contents which are said source editing material contents included in said held primary contents, and playback signal processing for actual content data of the sample contents regarding said lacking primary contents.

6. A content playing system comprising:

a content playing device; and a server device;

said content playing device further including an identifying unit configured to identify, with regard to subsidiary contents created by editing processing secondarily using at least content as editing material and having, as information for reproducing content of the subsidiary contents, playback control information formed of content instructing playback of actual content data of source editing material contents which are primary contents serving as source editing material, lacking primary contents, which are said source editing material contents that are not included in held primary contents deemed to be held by a user;

a sample content obtaining unit configured to externally obtain, from said server device, sample contents corresponding to said lacking primary contents by communication via a communication network, and a playback processing unit configured to execute, at a time of playing said subsidiary contents following said playback control information, playback signal processing for actual content data of held source editing material contents which are said held primary contents, for the held source editing material contents which are said source editing material contents included in said held primary contents, and playback signal processing for actual content data of the sample contents regarding said lacking primary contents;

and said server device further including a storage unit configured to store said sample contents; and a transmission unit configured to transmit to said content playing device said sample contents which said sample content obtaining unit are to obtain, from said sample contents stored in said storage unit, by communication via the communication network.

* * * * *